United States Patent
Shey et al.

(10) Patent No.: US 11,919,368 B2
(45) Date of Patent: Mar. 5, 2024

(54) HEAT PUMP FOR A VEHICLE

(71) Applicant: Ford Global Technologies, LLC, Dearborn, MI (US)

(72) Inventors: Rachael Shey, Clawson, MI (US); Jeffrey Paul Brown, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 17/495,956

(22) Filed: Oct. 7, 2021

(65) Prior Publication Data

US 2023/0113540 A1   Apr. 13, 2023

(51) Int. Cl.
  *B60H 1/00*   (2006.01)
  *F25B 30/02*   (2006.01)
  (Continued)

(52) U.S. Cl.
  CPC ..... *B60H 1/00907* (2013.01); *B60H 1/00342* (2013.01); *B60H 1/00921* (2013.01); *F25B 30/02* (2013.01); *F25B 41/20* (2021.01); *F25B 41/24* (2021.01); *F25B 41/30* (2021.01); *F25B 41/42* (2021.01); *B60H 1/00278* (2013.01); *B60H 2001/00307* (2013.01); *B60H 2001/00928* (2013.01); *B60H 2001/00935* (2013.01); *B60H 2001/00942* (2013.01);
  (Continued)

(58) Field of Classification Search
  CPC ............ B60H 1/00907; B60H 1/00342; B60H 2001/00928; B60H 2001/00935; B60H 2001/00957; B60H 1/00278; B60H 2001/00307; B60H 2001/00942; B60H 1/00921; F25B 30/02; F25B 41/20; F25B 41/24; F25B 41/31; F25B 41/40; F25B 41/30; F25B 2339/047; F25B 2400/13; F25B 41/42
  See application file for complete search history.

(56) References Cited

U.S. PATENT DOCUMENTS

| | | | | |
|---|---|---|---|---|
| 4,940,079 A | * | 7/1990 | Best | F25B 13/00 165/236 |
| 5,172,564 A | * | 12/1992 | Reedy | F24D 17/02 62/505 |

(Continued)

*Primary Examiner* — Ljiljana V. Ciric
(74) *Attorney, Agent, or Firm* — Vichit Chea; Price Heneveld LLP

(57) ABSTRACT

A heat pump includes a refrigerant loop. The refrigerant loop includes a first heat exchanger, a first region of a second heat exchanger, a third heat exchanger, a fourth heat exchanger, a first heat exchange fluid, a compressor, a vapor generator, and a four-way valve. The compressor includes a low-pressure inlet, a mid-pressure inlet, and an outlet. The vapor generator is positioned downstream of the outlet of the compressor and upstream of both the low-pressure inlet and the mid-pressure inlet. The four-way valve is positioned immediately upstream of the first heat exchanger. At least one component chosen from the group including the first heat exchanger, the second heat exchanger, and the vapor generator is free from compressor-driven flow of the first heat exchange fluid during a predetermined set of heating modes of operation of the heat pump and a predetermined set of cooling modes of operation of the heat pump.

13 Claims, 12 Drawing Sheets

(51) Int. Cl.

*F25B 41/20* (2021.01)
*F25B 41/24* (2021.01)
*F25B 41/30* (2021.01)
*F25B 41/31* (2021.01)
*F25B 41/40* (2021.01)
*F25B 41/42* (2021.01)

(52) U.S. Cl.

CPC .... *B60H 2001/00957* (2013.01); *F25B 41/31* (2021.01); *F25B 41/40* (2021.01); *F25B 2339/047* (2013.01); *F25B 2400/13* (2013.01)

(56) References Cited

U.S. PATENT DOCUMENTS

| | | | |
|---|---|---|---|
| 6,920,922 B2 | 7/2005 | Takeuchi | |
| 8,375,741 B2* | 2/2013 | Taras | F25B 49/027 62/513 |
| 9,200,820 B2* | 12/2015 | Okazaki | F25B 13/00 |
| 9,267,720 B2* | 2/2016 | Choi | F25B 49/022 |
| 9,562,712 B2* | 2/2017 | Kasuya | F25B 47/022 |
| 9,612,041 B2 | 4/2017 | Kawakami et al. | |
| 9,786,964 B2 | 10/2017 | Takeuchi et al. | |
| 9,885,504 B2* | 2/2018 | Xu | F25B 30/02 |
| 10,391,835 B2 | 8/2019 | Blatchley et al. | |
| 10,465,952 B2* | 11/2019 | He | F25B 47/022 |
| 10,737,552 B2* | 8/2020 | He | F25B 41/20 |
| 10,753,661 B2* | 8/2020 | Hammond | F25B 49/02 |
| 10,823,463 B2* | 11/2020 | Liu | F25B 41/20 |
| 11,254,190 B2* | 2/2022 | He | F25B 6/04 |
| 11,560,042 B2* | 1/2023 | Brown | B60H 1/32284 |
| 2012/0017637 A1 | 1/2012 | Nakajo et al. | |
| 2020/0039323 A1* | 2/2020 | He | B60H 1/00914 |
| 2020/0240680 A1* | 7/2020 | Lv | F25B 13/00 |
| 2020/0290429 A1 | 9/2020 | Blatchley et al. | |
| 2022/0212517 A1* | 7/2022 | Yu | B60H 1/3227 |
| 2022/0412611 A1* | 12/2022 | Brown | F25B 49/022 |
| 2023/0109595 A1* | 4/2023 | Brown | F25B 41/24 62/244 |
| 2023/0113540 A1* | 4/2023 | Shey | F25B 41/42 62/324.6 |
| 2023/0114381 A1* | 4/2023 | Shey | B60H 1/00885 62/324.1 |
| 2023/0126723 A1* | 4/2023 | Shey | B60H 1/3223 62/160 |
| 2023/0131019 A1* | 4/2023 | Shey | B60H 1/00278 62/160 |
| 2023/0182535 A1* | 6/2023 | Shey | B60H 1/00885 62/160 |
| 2023/0194129 A1* | 6/2023 | Shey | B60H 1/00921 62/498 |
| 2023/0349597 A1* | 11/2023 | Shey | F25B 25/005 |
| 2023/0366591 A1* | 11/2023 | Shey | F25B 41/24 |
| 2023/0366595 A1* | 11/2023 | Shey | F25B 40/00 |

\* cited by examiner

HEAT PUMP FOR A VEHICLE

FIELD OF THE DISCLOSURE

The present disclosure generally relates to a heat pump. More specifically, the present disclosure relates to a heat pump for a vehicle.

BACKGROUND OF THE INVENTION

Heat pumps have been employed in vehicles. A refrigerant loop can be included in such heat pumps.

SUMMARY OF THE INVENTION

According to a first aspect of the present invention, a heat pump includes a refrigerant loop. The refrigerant loop includes a first heat exchanger, a first region of a second heat exchanger, a third heat exchanger, a fourth heat exchanger, a compressor, a vapor generator, and a four-way valve. The compressor includes a low-pressure inlet, a mid-pressure inlet, and an outlet. The vapor generator is positioned downstream of the outlet of the compressor and upstream of both the low-pressure inlet and the mid-pressure inlet. The four-way valve is positioned immediately upstream of the first heat exchanger. At least one component chosen from the first heat exchanger, the second heat exchanger, and the vapor generator is free from compressor-driven flow of the first heat exchange fluid during a first predetermined set of heating modes of operation of the heat pump and a first predetermined set of cooling modes of operation of the heat pump.

Embodiments of the first aspect of the invention can include any one or a combination of the following features:
- the refrigerant loop further includes a first three-way valve positioned downstream of the outlet of the compressor and upstream of an inlet of the first heat exchanger, wherein the first three-way valve is positioned upstream of the first region of the second heat exchanger;
- the four-way valve is positioned downstream of the first three-way valve;
- the refrigerant loop further includes a second three-way valve positioned immediately downstream of the first heat exchanger;
- the refrigerant loop further includes a third three-way valve positioned downstream of the third heat exchanger, wherein the third three-way valve is positioned downstream of the fourth heat exchanger, and wherein the third three-way valve is positioned upstream of the low-pressure inlet;
- the refrigerant loop further includes an accumulator positioned immediately upstream of the low-pressure inlet of the compressor and immediately downstream of the third three-way valve;
- the refrigerant loop further includes a first shutoff valve plumbed in series with the first heat exchanger and a second shutoff valve plumbed in series with the first heat exchanger, wherein the first shutoff valve is in a closed position when the second shutoff valve is in an open position, and wherein the second shutoff valve is in a closed position when the first shutoff valve is in an open position;
- the refrigerant loop further includes a third shutoff valve positioned downstream of the vapor generator;
- the vapor generator is a liquid-gas separator valve;
- the vapor generator is a plate-style heat exchanger;
- the refrigerant loop further includes a first expansion valve positioned upstream of a first region of the vapor generator;
- the refrigerant loop further includes a second expansion valve positioned upstream of the four-way valve, a third expansion valve positioned immediately upstream of the third heat exchanger, and a fourth expansion valve positioned immediately upstream of the fourth heat exchanger; and
- a coolant loop that includes a second region of the second heat exchanger, a pump, a fifth heat exchanger, a reservoir, and a coolant network of conduits that fluidly couples components of the coolant loop.

According to a second aspect of the present disclosure, a heat pump includes a refrigerant loop. The refrigerant loop includes a refrigerant network of conduits that fluidly couples components of the refrigerant loop and a first heat exchange fluid that circulates through the refrigerant network of conduits. The refrigerant loop also includes a compressor having a low-pressure inlet, a mid-pressure inlet, and an outlet. The refrigerant loop further includes a first heat exchanger, a first region of a second heat exchanger, a third heat exchanger, a fourth heat exchanger, a vapor generator, a first three-way valve, and a four-way valve. The vapor generator is positioned downstream of the outlet of the compressor and upstream of both the low-pressure inlet and the mid-pressure inlet. The first three-way valve is positioned downstream of the outlet of the compressor and upstream of an inlet of the first heat exchanger. The first three-way valve is positioned upstream of the first region of the second heat exchanger. The four-way valve is positioned immediately upstream of the first heat exchanger. The four-way valve is positioned downstream of the first three-way valve. At least one component chosen from the first heat exchanger, the second heat exchanger, and the vapor generator is free from compressor-driven flow of the first heat exchange fluid during a first predetermined set of heating modes of operation of the heat pump and a first predetermined set of cooling modes of operation of the heat pump.

Embodiments of the second aspect of the present disclosure can include any one or a combination of the following features:
- the refrigerant loop further includes a second three-way valve positioned immediately downstream of the first heat exchanger;
- the refrigerant loop further includes a third three-way valve positioned downstream of the third heat exchanger, wherein the third three-way valve is positioned downstream of the fourth heat exchanger, and wherein the third three-way valve is positioned upstream of the low-pressure inlet;
- the refrigerant loop further includes a first shutoff valve plumbed in series with the first heat exchanger, a second shutoff valve plumbed in series with the first heat exchanger, wherein the first shutoff valve is in a closed position when the second shutoff valve is in an open position, and wherein the second shutoff valve is in a closed position when the first shutoff valve is in an open position, and a third shutoff valve is positioned downstream of the vapor generator;
- the refrigerant loop further includes a first expansion valve positioned upstream of a first region of the vapor generator, a second expansion valve positioned upstream of the four-way valve, a third expansion valve positioned immediately upstream of the third heat exchanger, and a fourth expansion valve positioned immediately upstream of the fourth heat exchanger;

the refrigerant loop further includes an accumulator positioned immediately upstream of the low-pressure inlet of the compressor and immediately downstream of the third three-way valve; and a coolant loop that includes a second region of the second heat exchanger, a pump, a fifth heat exchanger, a reservoir, and a coolant network of conduits that fluidly couples components of the coolant loop.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
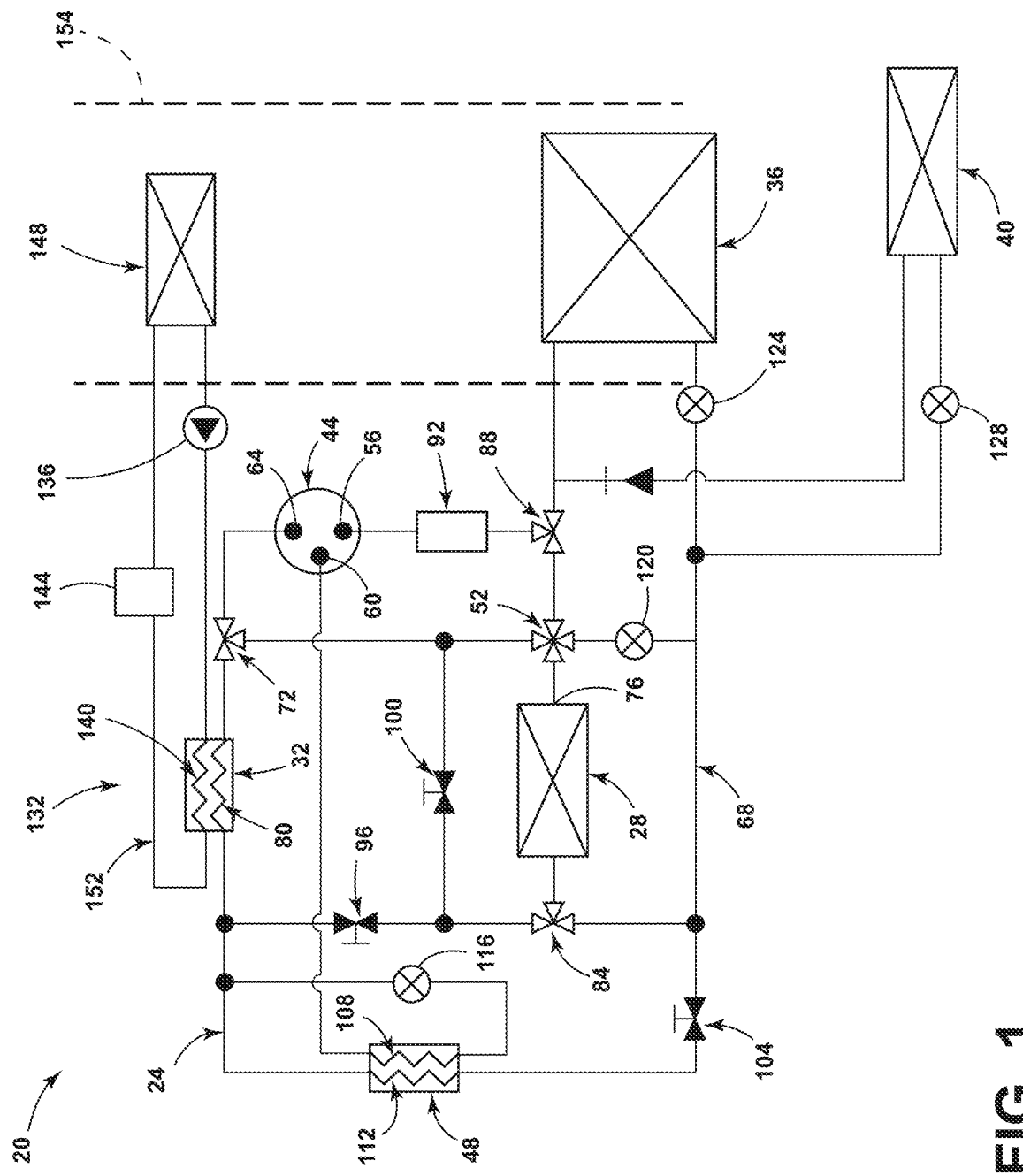
FIG. 1 is a schematic representation of a heat pump arrangement, illustrating a refrigerant loop and a coolant loop, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat pump. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-12, reference numeral 20 generally designates a heat pump. The heat pump 20 includes a refrigerant loop 24. The refrigerant loop 24 includes a first heat exchanger 28, a second heat exchanger 32, a third heat exchanger 36, a fourth heat exchanger 40, a compressor 44, a vapor generator 48, and a four-way valve 52. The compressor 44 includes a low-pressure inlet 56, a mid-pressure inlet 60, and an outlet 64. The vapor generator 48 is positioned downstream of the outlet 64 of the compressor 44 and upstream of both the low-pressure inlet 56 and the mid-pressure inlet 60. The four-way valve 52 is positioned immediately upstream of the first heat exchanger 28. A refrigerant network of conduits 68 fluidly couples the various components of the refrigerant loop 24. A first heat exchange fluid is circulated through the refrigerant network of conduits 68. The refrigerant network of conduits 68 is fluidly coupled with various components of the refrigerant loop 24 that will be discussed herein. For the sake of brevity and clarity, individual sections of the refrigerant network of conduits 68 will not be discussed unless additional clarity is provided by such discussion. Rather, the flow of the first heat exchange fluid will be described with regard to the interaction between the first heat exchange fluid and the various components of the refrigerant loop 24. At least one component chosen from the first heat exchanger 28, the second heat exchanger 32, and the vapor generator 48 is free from flow driven by the compressor 44 (i.e., compressor-driven flow) of the first heat exchange fluid during a first predetermined set of heating modes of operation of the heat pump 20 and a first predetermined set of cooling modes of operation of the heat pump 20, as will be discussed in further detail herein.

Referring again to FIGS. 1-12, the refrigerant loop 24 of the heat pump 20 also includes a first three-way valve 72 that is positioned downstream of the outlet 64 of the compressor 44. The first three-way valve 72 is positioned upstream of an inlet 76 of the first heat exchanger 28. The first three-way valve 72 is also positioned upstream of a first region 80 of the second heat exchanger 32. The four-way valve 52 is positioned downstream of the first three-way valve 72. A second three-way valve 84 is positioned immediately downstream of the first heat exchanger 28. A third three-way valve 88 is positioned downstream of the third heat exchanger 36. The third three-way valve 88 is also positioned downstream of the fourth heat exchanger 40. The third three-way valve 88 is positioned upstream of the low-pressure inlet 56 of the compressor 44. In various examples, an accumulator 92 can be positioned immediately upstream of the low-pressure inlet 56 of the compressor 44 and immediately downstream of the third three-way valve 88. The accumulator 92 may be a suction accumulator. In general, the accumulator 92 can protect the compressor 44 from liquid slugging or liquid being introduced into the compressor 44. The accumulator 92 can also retain moisture and contaminants from the refrigerant loop 24 and ensure that only refrigerant, such as the first heat exchange fluid, is returning to the compressor 44. It is contemplated that a receiver-dryer may be used in place of the accumulator 92 or in addition to the accumulator 92. In examples that employ the receiver-dryer, the receiver-dryer can be positioned along the refrigerant loop 24 (e.g., along the refrigerant network of conduits 68). When employed, the receiver-dryer can act as a temporary storage container for the first heat exchange fluid during low system demands when operating the heat pump 20. Additionally, the receiver-dryer can contain a desiccant that is used to absorb moisture (e.g., water) that may have entered the first heat exchange fluid. In some examples, the receiver-dryer may include a filter that can trap debris that may have entered into the refrigerant loop 24 and/or the first heat exchange fluid.

Referring further to FIGS. 1-12, the refrigerant loop 24 can include a first shutoff valve 96 that is plumbed in series with the first heat exchanger 28. Additionally, the refrigerant loop 24 includes a second shutoff valve 100 that is plumbed in series with the first heat exchanger 28. In various examples, the first shutoff valve 96 may be placed in a closed position when the second shutoff valve 100 is in an open position. Similarly, the second shutoff valve 100 may be placed in a closed position when the first shutoff valve 96 is in an open position. In some examples of the heat pump 20, the first shutoff valve 96 and the second shutoff valve 100 may be opened in a mutually exclusive manner That is to say, in some examples, that the compressor 44 may drive the first heat exchange fluid through only one of the first shutoff valve 96 or the second shutoff valve 100 during the operation of a given mode of operation of the heat pump 20, as will be discussed in further detail herein. A third shutoff valve 104 can be positioned downstream of the vapor generator 48. In various examples, the vapor generator 48 can be a liquid-gas separator valve. In such examples, the liquid-gas separator valve may perform a thermal phase separation and/or a mechanical phase separation, whereby a gaseous component of the first heat exchange fluid that is circulating through the refrigerant loop 24 is extracted, at least in part. The portion of the gaseous component of the first heat exchange fluid extracted by the liquid-gas separator valve may then be injected into the compressor at the mid-pressure inlet 60. Additionally, in such examples, the remainder of the first heat exchange fluid, which may contain liquid and gas components, is circulated through the refrigerant network of conduits 68 to remaining components of the refrigerant loop 24 for the given mode of operation. This remaining portion of the first heat exchange fluid eventually is directed to the low-pressure inlet 56 of the compressor 44. In alternative examples, the vapor generator 48 may be a plate-style heat exchanger. In such examples, the vapor generator 48 includes a first region 108 and a second region 112.

Referring still further to FIGS. 1-12, a first expansion valve 116 is positioned upstream of the first region 108 of the vapor generator 48. A second expansion valve 120 is positioned upstream of the four-way valve 52. A third expansion valve 124 is positioned immediately upstream of the third heat exchanger 36. A fourth expansion valve 128 is positioned immediately upstream of the fourth heat exchanger 40. The heat pump 20 can further include a coolant loop 132. The coolant loop 132 includes a pump 136, a second region 140 of the second heat exchanger 32, a reservoir 144, a fifth heat exchanger 148, and a coolant network of conduits 152 that fluidly couples components of the coolant loop 132. A second heat exchange fluid flows through the coolant network of conduits 152 of the coolant loop 132, as well as the components of the coolant loop 132. The first and second heat exchange fluids thermally interact by way of the second heat exchanger 32. More specifically, as the first and second heat exchange fluids flow through the first region 80 and the second region 140 of the second heat exchanger 32, respectively, the first and second heat exchange fluids thermally interact. In various examples, the fifth heat exchanger 148 can be in fluid communication with ductwork 154 of a Heating, Ventilation, and Air Conditioning (HVAC) system. Similarly, the third heat exchanger 36 can be in fluid communication with the ductwork 154 of the HVAC system. Accordingly, the third and fifth heat exchangers 36, 148 may be employed to alter a temperature of ambient air and provide temperature-controlled air to an environment (e.g., a cabin of a vehicle).

Figure 2:
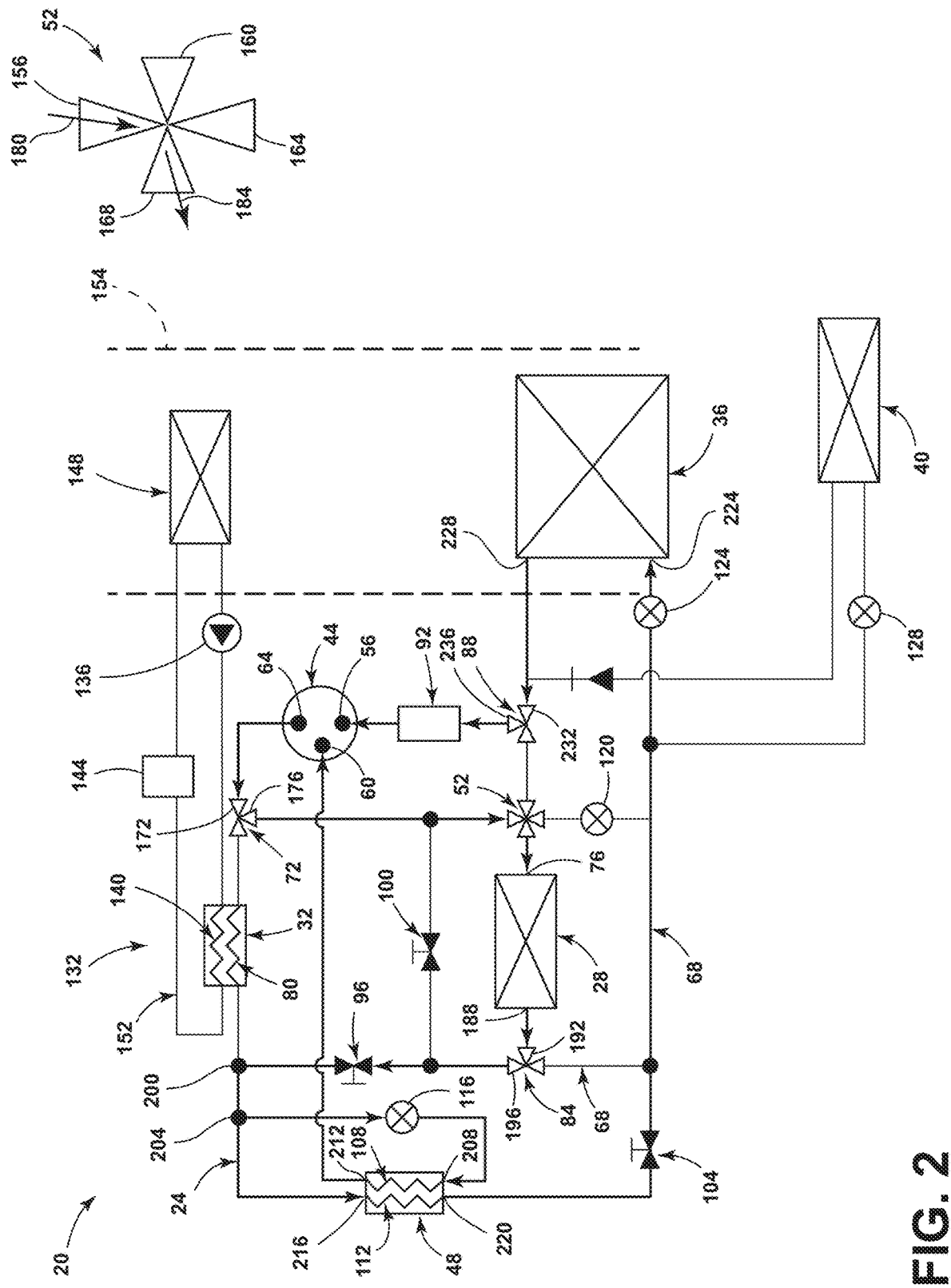
FIG. 2 is a schematic representation of the heat pump arrangement, illustrating a cabin cooling mode of operation, according to one example.
Figure 3:
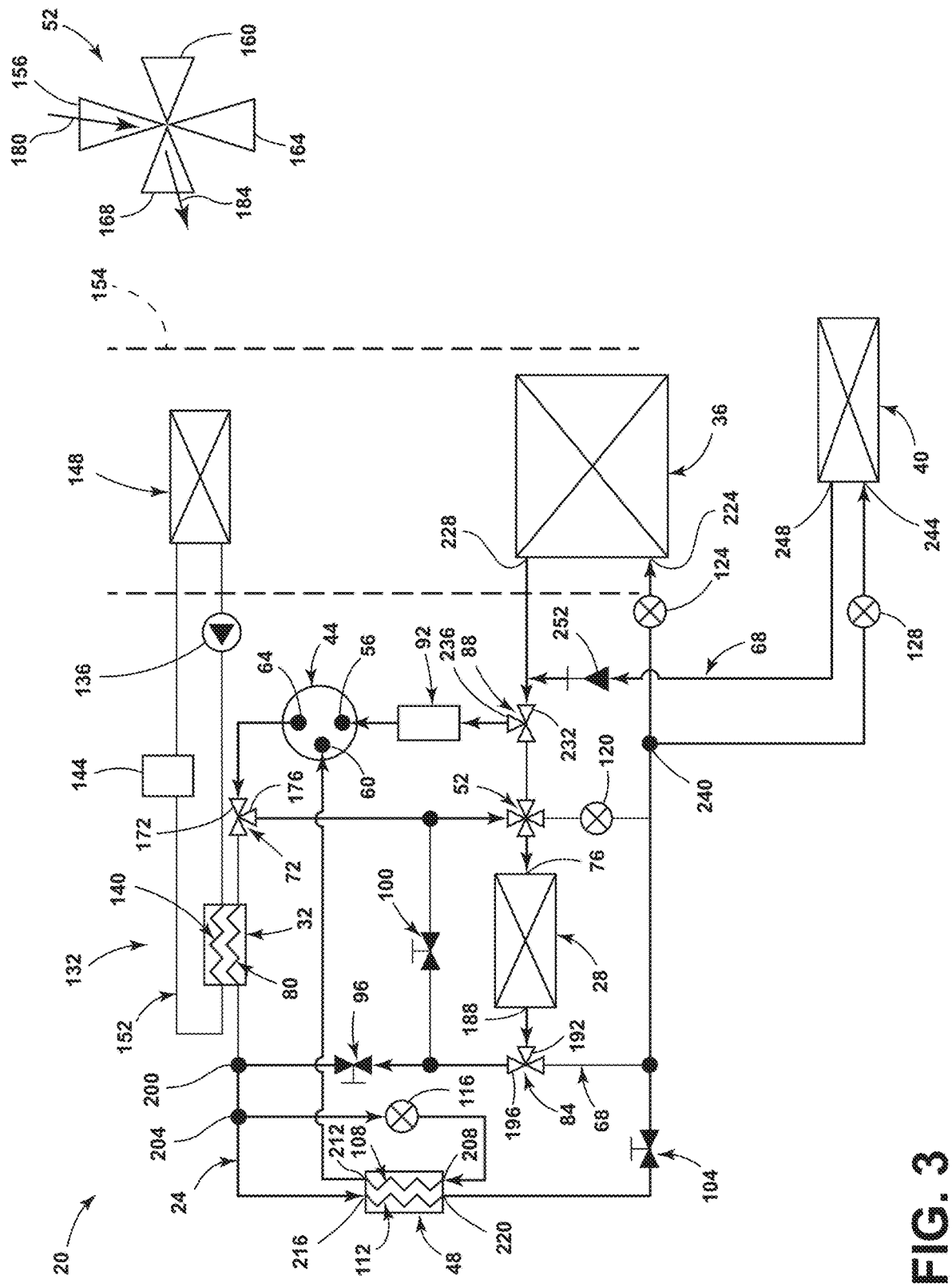
FIG. 3 is a schematic representation of the heat pump arrangement, illustrating a cabin and battery cooling mode of operation, according to one example.
Figure 4:
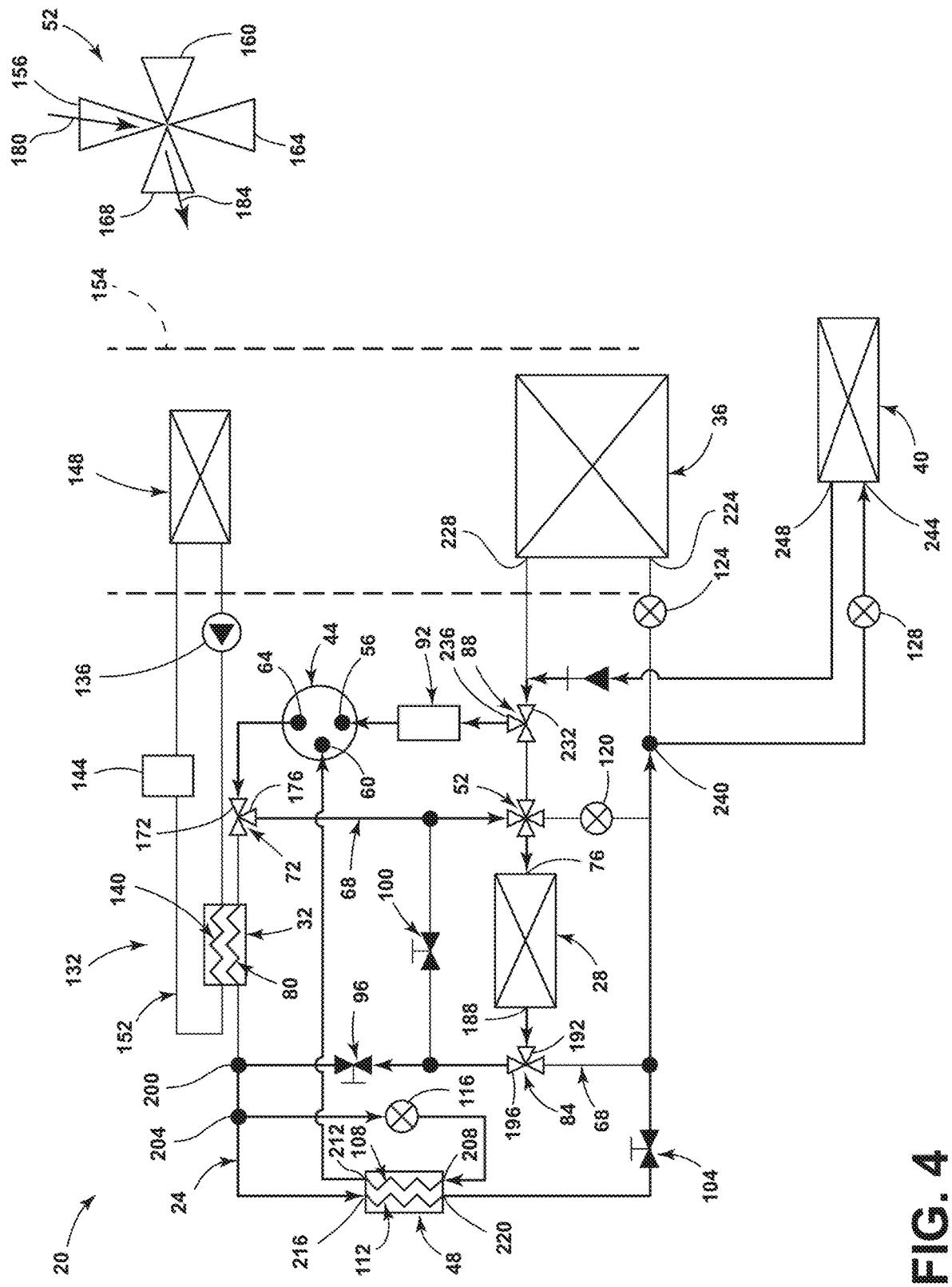
FIG. 4 is a schematic representation of the heat pump arrangement, illustrating a battery cooling mode of operation, according to one example.

Referring now to FIGS. 2-4, exemplary modes of operation are depicted. More specifically, a cabin cooling mode of operation (FIG. 2), a cabin and battery cooling mode of operation (FIG. 3), and a battery cooling mode of operation (FIG. 4) are depicted in exemplary fatal. In each of these modes of operation, the four-way valve 52 includes a first port 156, a second port 160, a third port 164, and a fourth port 168. An expanded view of the four-way valve 52 is inset into FIGS. 2-4 to aid in discussion of the operation of the four-way valve 52 in the given mode of operation. In each of these modes of operation, the coolant loop 132 may be omitted from use. For example, the pump 136 that is positioned within the coolant loop 132 may be placed in an off state. Said another way, in each of these modes of operation, the first region 80 of the second heat exchanger 32 does not receive flow of the first heat exchange fluid that is driven by the compressor 44. In the cabin cooling mode of operation (FIG. 2), the fourth heat exchanger 40 and the fourth expansion valve 128 may be omitted from flow of the first heat exchange fluid, as driven by the compressor 44. Similarly, in the battery cooling mode of operation (FIG. 4), the third heat exchanger 36 and the third expansion valve 124 may be omitted from flow of the first heat exchange fluid, as driven by the compressor 44. For example, the third expansion valve 124 may be capable of operating as a shutoff valve such that the third expansion valve 124 is placed in a closed state that prevents flow of the first heat exchange fluid from passing through the third heat exchanger 36. Similarly, the fourth expansion valve 128 may be capable of operating as a shutoff valve such that the fourth expansion valve 128 is placed in a closed state that prevents flow of the first heat exchange fluid from passing through the fourth heat exchanger 40.

Referring again to FIGS. 2-4, the position of the first three-way valve 72 may prevent the first heat exchange fluid from interacting with the second heat exchanger 32. The compressor 44 acts upon the first heat exchange fluid and drives the first heat exchange fluid from the outlet 64 toward the first three-way valve 72. The first heat exchange fluid enters a first port 172 of the first three-way valve 72 and exits a second port 176 of the first three-way valve 72 as a result of the position of the first three-way valve 72. After exiting the second port 176 of the first three-way valve 72, the first heat exchange fluid flows to the first port 156 of the four-way valve 52. The four-way valve 52 is adjusted in its position to receive the first heat exchange fluid at the first port 156 such that the first port 156 operates as an inlet, as indicated by arrow 180. The position of the four-way valve 52 directs the first heat exchange fluid received at the first port 156 to exit the four-way valve 52 at the fourth port 168, as indicated by arrow 184. Upon exiting the fourth port 168 of the four-way valve 52, the first heat exchange fluid enters the first heat exchanger 28 at the inlet 76 of the first heat exchanger 28. As the first heat exchange fluid flows through the first heat exchanger 28, the first heat exchange fluid may thermally interact with a heat exchange fluid that is external to the refrigerant loop 24 and the coolant loop 132 (e.g., ambient air) such that heat may be removed from the first heat exchange fluid. The first heat exchange fluid exits the first heat exchanger 28 at an outlet 188 of the first heat exchanger 28. Upon exiting the first heat exchanger 28 by way of the outlet 188, the first heat exchange fluid enters into a first port 192 of the second three-way valve 84. The second three-way valve 84 is positioned such that the first heat exchange fluid is directed to a second port 196 of the second three-way valve 84. In each of these modes of operation, the second shutoff valve 100 is in the closed position and the first shutoff valve 96 is in the open position. Upon exiting the second port 196 of the second three-way valve 84, the first heat exchange fluid is directed toward the first shutoff valve 96 by the refrigerant network of conduits 68.

Referring further to FIGS. 2-4, after flowing through the first shutoff valve 96, the first heat exchange fluid encounters a first coupling point 200 between sections of the refrigerant network of conduits 68. From the first coupling point 200, the first heat exchange fluid is directed toward a first branching point 204. As the first heat exchange fluid encounters the first branching point 204, a portion of the first heat exchange fluid is diverted toward the first expansion valve 116, while the remaining portion of the first heat exchange fluid continues toward the second region 112 of the vapor generator 48. In various examples, the portion of the first heat exchange fluid that is diverted toward the first expansion valve 116 can be expressed as a ratio or percentage. For example, expressing the ratio as a percentage of the first heat exchange fluid that is diverted toward the first expansion valve 116, the first expansion valve 116 can receive about 5%, about 10%, about 15%, about 20%, about 25%, about 30%, about 35%, about 40%, about 45%, about 50%, about 55%, or about 60% of the first heat exchange fluid that encounters the first branching point 204. The remainder, or balancing percentage, of the first heat exchange fluid that encounters the first branching point 204 and is not diverted toward the first expansion valve 116 can continue toward the second region 112 of the vapor generator 48. It is contemplated that in different modes of operation of the heat pump 20, the percentage of the first heat exchange fluid that is received by the first expansion valve 116 may vary. The portion of the first heat exchange fluid that is diverted toward the first expansion valve 116 flows through the first expansion valve 116 and is directed toward an inlet 208 of the first region 108 of the vapor generator 48. This diverted portion of the first heat exchange fluid flows through the first region 108 and exits the vapor generator 48 at an outlet 212 of the vapor generator 48. The portion of the first heat exchange fluid that was diverted toward the first expansion valve 116 decreases in pressure and temperature as a result of interaction with the first expansion valve 116. Accordingly, the first heat exchange fluid flowing through the first region 108 of the vapor generator 48 has a lower pressure and temperature than the first heat exchange fluid flowing through the second region 112. Therefore, the first heat exchange fluid within the first region 108 thermally interacts with the first heat exchange fluid flowing through the second region 112 of the vapor generator 48.

Referring still further to FIGS. 2-4, as a result of the thermal interaction between the first heat exchange fluid within the first region 108 and the first heat exchange fluid within the second region 112, the first heat exchange fluid within the first region 108 exits the vapor generator 48 at the outlet 212 of the first region 108 at a higher temperature, pressure, and/or vapor percentage than the first heat exchange fluid that entered the inlet 208 of the first region 108. The first heat exchange fluid that exits the first region 108 by way of the outlet 212 is directed toward the mid-pressure inlet 60 of the compressor 44. The first heat exchange fluid from the first region 108 of the vapor generator 48 is injected into the compressor 44. The injection of the first heat exchange fluid at the mid-pressure inlet 60 of the compressor 44 can improve efficiency of the refrigerant loop 24 and/or increase a heat exchange capacity of the refrigerant loop 24. For example, the injection the first heat exchange fluid at the mid-pressure inlet 60 of the compressor 44 can increase a condensing capacity of the refrigerant loop 24 while decreasing a load experienced by the compressor 44. The improved condensing capacity of the refrigerant loop 24 and the decreased load on the compressor 44 can contribute to performance and efficiency improvements for the heat pump 20 and/or the refrigerant loop 24. Additionally, the injection of the first heat exchange fluid at the mid-pressure inlet 60 can increase an ambient temperature operating range of the heat pump 20 and/or the refrigerant loop 24.

Referring yet again to FIGS. 2-4, the portion of the first heat exchange fluid that was not diverted toward the first expansion valve 116 and instead flowed toward an inlet 216 of the second region 112 of the vapor generator 48 thermally interacts with the first heat exchange fluid that was diverted toward the first expansion valve 116. During this thermal interaction between the first heat exchange fluid within the second region 112 and the first heat exchange fluid within the first region 108, heat is transferred from the first heat exchange fluid within the second region 112 to the first heat exchange fluid within the first region 108. Accordingly, the first heat exchange fluid exiting the vapor generator 48 at an outlet 220 of the second region 112 may be at a different temperature, pressure, and/or vapor percentage than the first heat exchange fluid that entered the inlet 216. For example, the first heat exchange fluid that exits the vapor generator 48 at the outlet 220 of the second region 112 may have a lower temperature and pressure than when the first heat exchange fluid entered the inlet 216 of the second region 112. Upon exiting the outlet 220 of the second region 112, the first heat exchange fluid is directed toward the third shutoff valve 104. The first heat exchange fluid flows through the third shutoff valve 104 as a result of the third shutoff valve 104 being in the open position.

With specific reference to FIG. 2, from the third shutoff valve 104, the first heat exchange fluid is directed toward the third expansion valve 124 by the refrigerant network of conduits 68. As with the first expansion valve 116, the first heat exchange fluid experiences a decrease in pressure and temperature as a result of interaction with the third expansion valve 124. After exiting the third expansion valve 124, the first heat exchange fluid is directed toward an inlet 224 of the third heat exchanger 36. The decreased temperature and pressure of the first heat exchange fluid flowing through the third heat exchanger 36 can be employed to provide cooling to air that is flowing through the ductwork 154 with which the third heat exchanger 36 is in fluid communication. Accordingly, the first heat exchange fluid that exits the third heat exchanger 36 by way of an outlet 228 of the third heat exchanger 36 may have an increased pressure, temperature, and/or vapor percentage than the first heat exchange fluid that entered the third heat exchanger 36 at the inlet 224. Upon exiting the third heat exchanger 36 by way of the outlet 228, the first heat exchange fluid is directed toward a first port 232 of the third three-way valve 88. As a result of the position of the third three-way valve 88, the first heat exchange fluid that is received at the first port 232 is directed out of a second port 236 of the third three-way valve and toward the accumulator 92. The accumulator 92 receives the first heat exchange fluid and provides a gaseous component of the first heat exchange fluid to the low-pressure inlet 56 of the compressor 44, thereby completing the traversal of the refrigerant loop 24 in the cabin cooling mode of operation.

With specific reference to FIG. 3, the cabin and battery cooling mode of operation is depicted according to one example. From the third shutoff valve 104, the first heat exchange fluid is directed toward the third expansion valve 124 by the refrigerant network of conduits 68. On the way to the third expansion valve 124, the first heat exchange fluid encounters a second branching point 240. At the second branching point 240, a first portion of the first heat exchange fluid is directed toward the fourth expansion valve 128 and a second portion of the first heat exchange fluid is directed toward the third expansion valve 124. The first portion of the first heat exchange fluid experiences a decrease in pressure and temperature as a result of interaction with the fourth expansion valve 128, Similarly, the second portion of the first heat exchange fluid experiences a decrease in pressure and temperature as a result of the interaction with the third expansion valve 124. After exiting the third expansion valve 124, the first heat exchange fluid is directed toward the inlet 224 of the third heat exchanger 36. The decreased temperature and pressure of the first heat exchange fluid flowing through the third heat exchanger 36 can be employed to provide cooling to air that is flowing through the ductwork 154 with which the third heat exchanger 36 is in fluid communication. Accordingly, the first heat exchange fluid that exits the third heat exchanger 36 by way of the outlet 228 of the third heat exchanger 36 may have an increased pressure, temperature, and/or vapor percentage than the first heat exchange fluid that entered the third heat exchanger 36 at the inlet 224.

Referring again to FIG. 3, upon exiting the third heat exchanger 36 by way of the outlet 228, the first heat exchange fluid is directed toward the first port 232 of the third three-way valve 88. Similarly, after exiting the fourth expansion valve 128, the first heat exchange fluid is directed toward an inlet 244 of the fourth heat exchanger 40. The decreased temperature and pressure of the first heat exchange fluid flowing through the fourth heat exchanger 40 as a result of interaction with the fourth expansion valve 128 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of an outlet 248 of the fourth heat exchanger 40 may have an increased pressure, temperature, and/or vapor percentage than the first heat exchange fluid that entered the fourth heat exchanger 40 at the inlet 244. Upon exiting the fourth heat exchanger 40 by way of the outlet 248, the first heat exchange fluid is directed toward a check valve 252 by the refrigerant network of conduits 68. In modes of operation where the first heat exchange fluid does not pass through the check valve 252 but the first heat exchange fluid does pass through the third heat exchanger 36 (e.g., FIGS. 2, 6, and 8), the check valve 252 prevents back flow toward the fourth heat exchanger 40. Accordingly, the check valve 252 prevents the fourth heat exchanger 40 from becoming a storage vessel for the first heat exchange fluid when the fourth heat exchanger 40 is not employed in a given mode of operation.

Referring further to FIG. 3, once the first heat exchange fluid passes through the check valve 252, the first portion of the first heat exchange fluid that was directed toward the fourth heat exchanger 40 is rejoined or recombined with the second portion of the first heat exchange fluid that was directed toward the third heat exchanger 36. The first and second portions of the first heat exchange fluid are rejoined or recombined downstream of the outlet 228 of the third heat exchanger 36. The check valve 252 prevents backflow or excessive back pressure at the outlet 248 of the fourth heat exchanger 40. From the check valve 252, the first heat exchange fluid is directed toward the first port 232 of the third three-way valve 88. As a result of the position of the third three-way valve 88, the first heat exchange fluid that is received at the first port 232 is directed out of the second port 236 of the third three-way valve and toward the accumulator 92. The accumulator 92 receives the first heat exchange fluid and provides a gaseous component of the first heat exchange fluid to the low-pressure inlet 56 of the compressor 44.

Referring particularly to FIG. 4, the battery cooling mode of operation is depicted in exemplary form. The fourth heat exchanger 40 can be associated with a battery pack of the vehicle or another component of the vehicle that produces heat, where the operation of such another component may benefit from the removal or dispersal of the heat produced. During the battery cooling mode of operation, the coolant loop 132 may be omitted from operation. The first heat exchange fluid is circulated through the fourth heat exchanger 40 but not through the third heat exchanger 36. From the third shutoff valve 104, the first heat exchange fluid is directed toward the third expansion valve 124 by the refrigerant network of conduits 68. On the way to the third shutoff valve 104, the first heat exchange fluid encounters the second branching point 240. The first heat exchange fluid is entirely diverted toward the fourth expansion valve 128 at the second branching point 240 without any appreciable amount of the first heat exchange fluid being directed toward the third expansion valve 124 or the fourth heat exchanger 40. Preventing the first heat exchange fluid from being directed toward the third expansion valve 124 and the third heat exchanger 36 may be accomplished, for example, by supplying a shutoff valve between the second branching point 240 and the third expansion valve 124 or by the third expansion valve 124 being capable of additionally operating as a shutoff valve. Regardless of the particular approach used to prevent the first heat exchange fluid from interacting with the third expansion valve 124 and the third heat exchanger 36, the first heat exchange fluid is directed entirely toward the fourth expansion valve 128. The first heat exchange fluid experiences a decrease in pressure and temperature as a result of interaction with the fourth expansion valve 128.

Referring again to FIG. 4, after exiting the fourth expansion valve 128, the first heat exchange fluid is directed toward the inlet 244 of the fourth heat exchanger 40. The decreased temperature and pressure of the first heat exchange fluid flowing through the fourth heat exchanger 40 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 248 of the fourth heat exchanger 40 may have an increased pressure, temperature, and/or vapor percentage than the first heat exchange fluid that entered the fourth heat exchanger 40 at the inlet 244. Upon exiting the fourth heat exchanger 40 by way of the outlet 248, the first heat exchange fluid is directed toward the check valve 252 by the refrigerant network of conduits 68. Once the first heat exchange fluid passes through the check valve 252, the first heat exchange fluid is directed toward the first port 232 of the third three-way valve 88. For example, the same approach that accomplished the prevention of the first heat exchange fluid from progressing to the third expansion valve 124 can provide sufficient flow resistance to prevent the first heat exchange fluid from entering the outlet 228 of the third heat exchanger 36 after passing through the check valve 252. As a result of the position of the third three-way valve 88, the first heat exchange fluid that is received at the first port 232 is directed out of the second port 236 of the third three-way valve and toward the accumulator 92. The accumulator 92 receives the first heat exchange fluid and provides a gaseous components of the first heat exchange fluid to the low-pressure inlet 56 of the compressor 44.

Referring now to FIGS. 5-9, various modes of operation of the heat pump 20 that employ the coolant loop 132 are depicted. The pump 136 is activated in these modes of operation such that a second heat exchange fluid is circulated through the components of the coolant loop 132. The second heat exchange fluid is driven from the pump 136 toward the second heat exchanger 32. Accordingly, the second heat exchange fluid thermally interacts with the first heat exchange fluid by way of the second heat exchanger 32. More specifically, the second heat exchange fluid is circulated through the second region 140 of the second heat exchanger 32 while the first heat exchange fluid is circulated through the first region 80 of the second heat exchanger 32. In various examples, the second heat exchange fluid may extract heat from the first heat exchange fluid at the second heat exchanger 32. From the second heat exchanger 32, the second heat exchange fluid is directed to an inlet 254 of the reservoir 144 by the coolant network of conduits 152. The reservoir 144 can accumulate the second heat exchange fluid. An outlet 256 of the reservoir 144 is plumbed to an inlet 260 of the fifth heat exchanger 148 by the coolant network of conduits 152. An outlet 264 of the fifth heat exchanger 148 is plumbed to the pump 136. Accordingly, as the pump 136 is operated, the second heat exchange fluid is pulled from the reservoir 144 and into the inlet 260 of the fifth heat exchanger 148 in a siphon-like manner. Said another way, operation of the pump 136 may generate a positive pressure at the inlet 254 of the reservoir 144 and a negative pressure at the outlet 256 of the reservoir. Therefore, the pressure differential across the reservoir 144 can facilitate the introduction of the second heat exchange fluid into the inlet 260 of the fifth heat exchanger 148. The second heat exchange fluid can provide heat to a cabin of a vehicle as a result of the fluid communication between the fifth heat exchanger 148 and the ductwork 154. For example, the fifth heat exchanger 148 may operate as a heater core. Alternatively, heat from the second heat exchange fluid may be transferred from the fifth heat exchanger 148 to components that can benefit from such heat, such as batteries or electrical components during cold weather conditions in the environment within which the vehicle or the heat pump 20 currently occupies at a given time.

Figure 5:
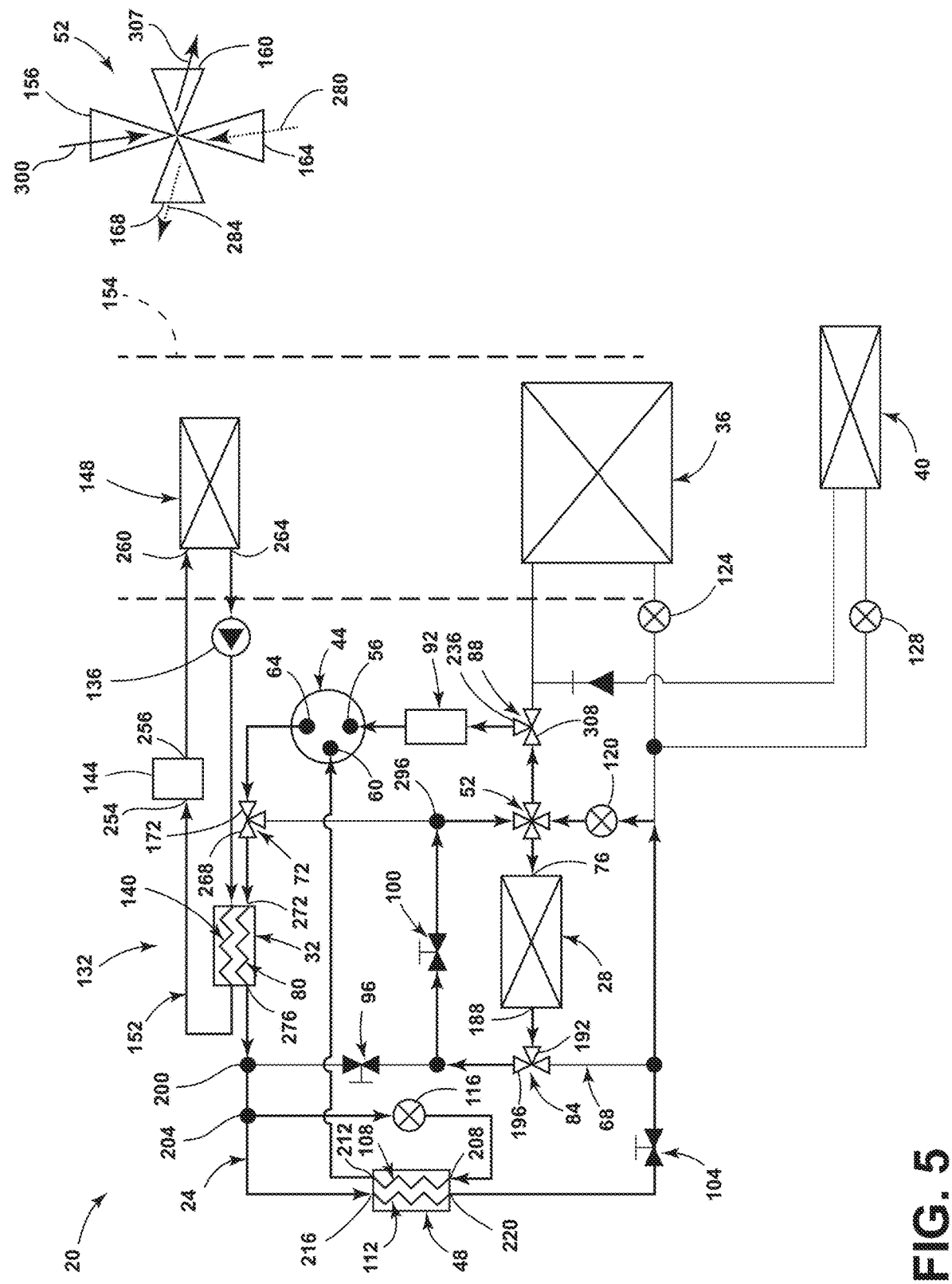
FIG. 5 is a schematic representation of the heat pump arrangement, illustrating a heating mode of operation, according to one example.
Figure 6:
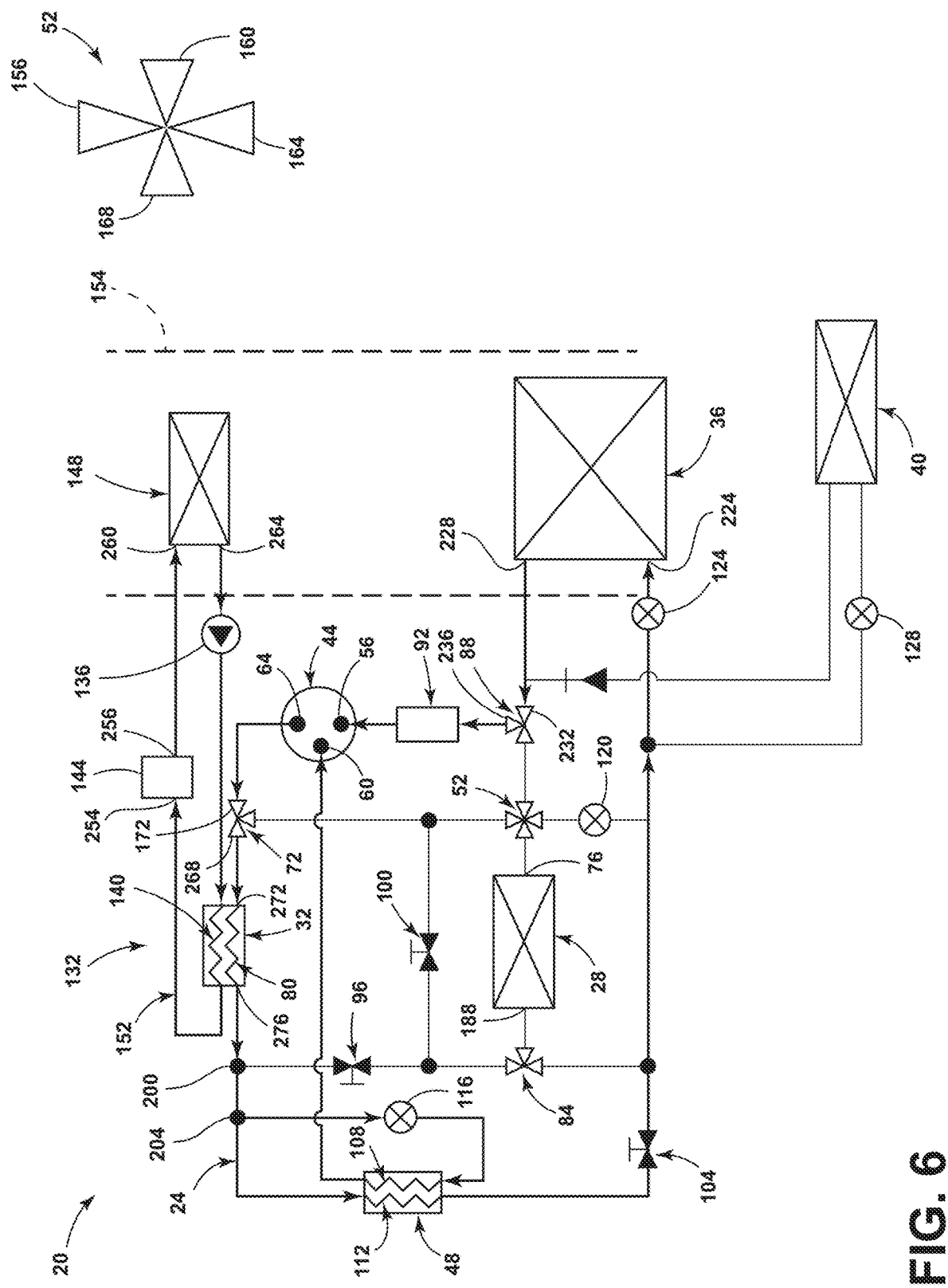
FIG. 6 is a schematic representation of the heat pump arrangement, illustrating a first reheat mode of operation, according to one example.
Figure 7:
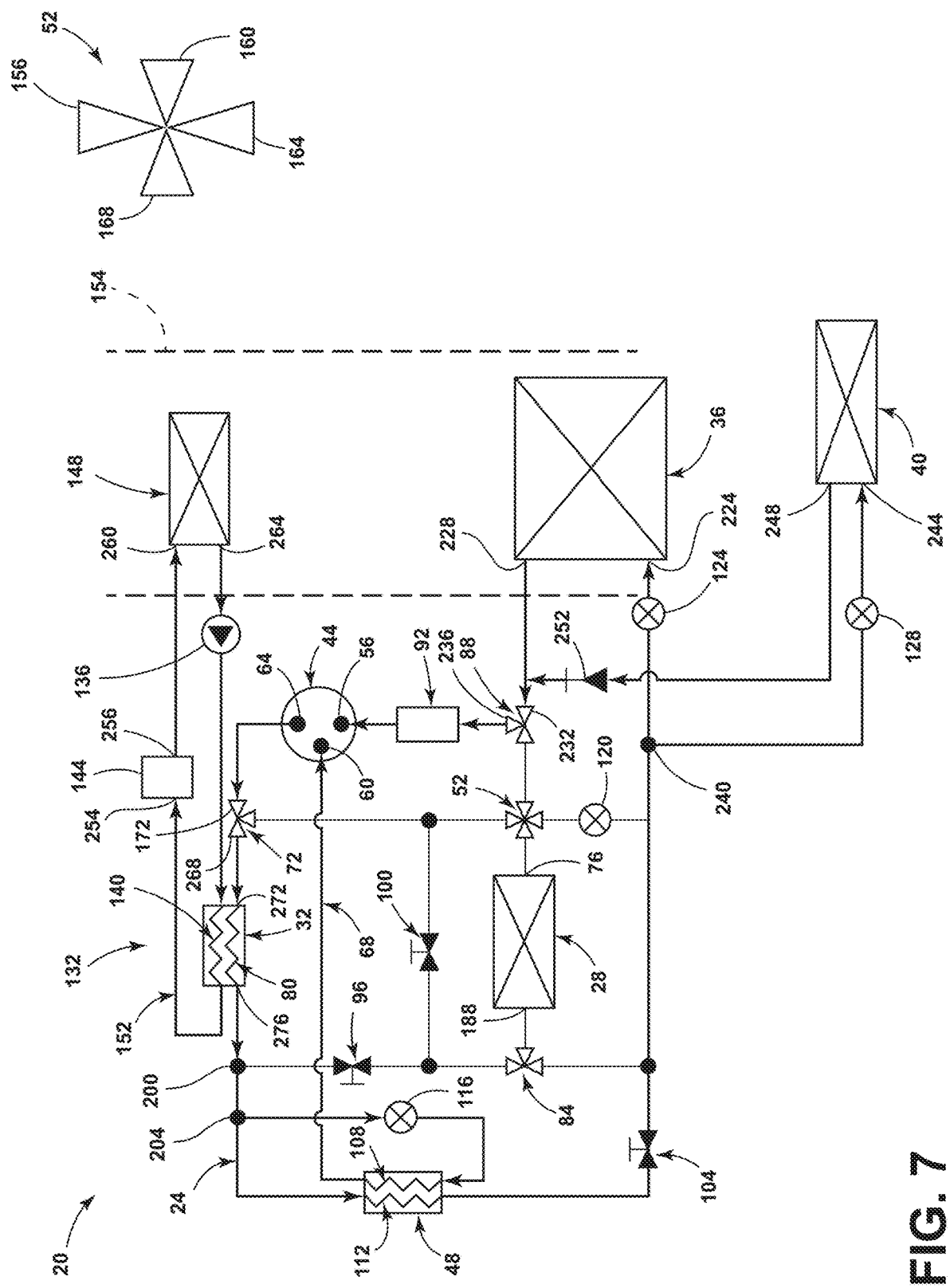
FIG. 7 is a schematic representation of the heat pump arrangement, illustrating a second reheat mode of operation, according to one example.

Referring to FIGS. 5-7, the compressor 44 acts upon the first heat exchange fluid to drive the first heat exchange fluid from the outlet 64 of the compressor 44 toward the first port 172 of the first three-way valve 72. The positioning of the first three-way valve 72 in these modes of operation is such that the first heat exchange fluid that is received at the first port 172 is directed out of a third port 268 of the first three-way valve 72. From the third port 268 of the first three-way valve 72, the first heat exchange fluid is directed toward an inlet 272 of the first region 80 of the second heat exchanger 32. In each of the depicted examples, the first shutoff valve 96 is in a closed position such that as the first heat exchange fluid exits the first region 80 of the second heat exchanger 32 by way of an outlet 276 of the first region 80, the first heat exchange fluid encounters the first coupling point 200 and passes the first coupling point 200 to continue on to the first branching point 204.

Referring again to FIGS. 5-9, as the first heat exchange fluid encounters the first branching point 204, a portion of the first heat exchange fluid is diverted toward the first expansion valve 116, while the remaining portion of the first heat exchange fluid continues toward the second region 112 of the vapor generator 48, In various examples, the portion of the first heat exchange fluid that is diverted toward the first expansion valve 116 can be expressed as a ratio or percentage. For example, expressing the ratio as a percentage of the first heat exchange fluid that is diverted toward the first expansion valve 116, the first expansion valve 116 can receive about 5%, about 10%, about 15%, about 20%, about 25%, about 30%, about 35%, about 40%, about 45%, about 50%, about 55%, or about 60% of the first heat exchange fluid that encounters the first branching point 204. The remainder, or balancing percentage, of the first heat exchange fluid that encounters the first branching point 204 and is not diverted toward the first expansion valve 116 can continue toward the second region 112 of the vapor generator 48. It is contemplated that in different modes of operation of the heat pump 20, the percentage of the first heat exchange fluid that is received by the first expansion valve 116 may vary.

Referring further to FIGS. 5-9, the portion of the first heat exchange fluid that is diverted toward the first expansion valve 116 flows through the first expansion valve 116 and is directed toward the inlet 208 of the first region 108 of the vapor generator 48. This diverted portion of the first heat exchange fluid flows through the first region 108 and exits the vapor generator 48 at the outlet 212 of the first region 108 of the vapor generator 48. The portion of the first heat exchange fluid that was diverted toward the first expansion valve 116 decreases in pressure and temperature as a result of interaction with the first expansion valve 116. Accordingly, the first heat exchange fluid flowing through the first region 108 of the vapor generator 48 has a lower pressure and temperature than the first heat exchange fluid flowing through the second region 112. Therefore, the first heat exchange fluid within the first region 108 thermally interacts with the first heat exchange fluid flowing through the second region 112 of the vapor generator 48. As a result of the thermal interaction between the first heat exchange fluid within the first region 108 and the first heat exchange fluid within the second region 112, the first heat exchange fluid within the first region 108 exits the vapor generator 48 at the outlet 212 of the first region 108 at a higher temperature, pressure, and/or vapor percentage than the first heat exchange fluid that entered the inlet 208 of the first region 108. The first heat exchange fluid that exits the first region 108 by way of the outlet 212 is directed toward the mid-pressure inlet 60 of the compressor 44. The first heat exchange fluid from the first region 108 of the vapor generator 48 is injected into the compressor 44 in a gaseous state. The injection of the first heat exchange fluid at the mid-pressure inlet 60 of the compressor 44 can improve efficiency of the refrigerant loop 24 and/or increase a heat exchange capacity of the refrigerant loop 24. For example, the injection of the first heat exchange fluid at the mid-pressure inlet 60 of the compressor 44 can increase a condensing capacity of the refrigerant loop 24 while decreasing a load experienced by the compressor 44. The improved condensing capacity of the refrigerant loop 24 and the decreased load on the compressor 44 can contribute to performance and efficiency improvements for the heat pump 20 and/or the refrigerant loop 24. Additionally, the injection of the first heat exchange fluid at the mid-pressure inlet 60 can increase an ambient temperature operating range of the heat pump 20 and/or the refrigerant loop 24.

Referring still further to FIGS. 5-9, the portion of the first heat exchange fluid that was not diverted toward the first expansion valve 116 and instead flowed toward the inlet 216 of the second region 112 of the vapor generator 48 thermally interacts with the first heat exchange fluid that was diverted toward the first expansion valve 116. During this thermal interaction between the first heat exchange fluid within the second region 112 and the first exchange fluid within the first region 108, heat is transferred from the first heat exchange fluid within the second region 112 to the first heat exchange fluid within the first region 108. Accordingly, the first heat exchange fluid exiting the vapor generator 48 at the outlet 220 of the second region 112 may be at a different temperature, pressure, and/or vapor percentage than the first heat exchange fluid that entered the inlet 216. For example, the first heat exchange fluid that exits the vapor generator 48 at the outlet 220 of the second region 112 may have a lower temperature and pressure than when the first heat exchange fluid entered the inlet 216 of the second region 112. Upon exiting the outlet 220 of the second region 112, the first heat exchange fluid is directed toward the third shutoff valve 104. The first heat exchange fluid flows through the third shutoff valve 104 as a result of the third shutoff valve 104 being in the open position.

With specific reference to FIG. 5, a heating mode of operation is depicted according to one example. In the heating mode of operation, the first heat exchange fluid is directed from the third shutoff valve 104 toward the second expansion valve 120. In this mode of operation, the third expansion valve 124 and the fourth expansion valve 128 prevent the first heat exchange fluid from being driven to the third heat exchanger 36 and the fourth heat exchanger 40, respectively. Alternatively, shutoff valves may be positioned immediately upstream of the third and fourth expansion valves 124, 128 to accomplish the same end. In either instance, the first heat exchange fluid is directed along the refrigerant network of conduits 68 to interact with the second expansion valve 120 after leaving the third shutoff valve 104. The first heat exchange fluid experiences a decreases in pressure and temperature as a result of interaction with the second expansion valve 120. From the second expansion valve 120, the first heat exchange fluid is direct toward the third port 164 of the four-way valve 52. Accordingly, the positioning of the four-way valve 52 in the heating mode of operation employs the third port 164 of the four-way valve 52 as a first inlet, as indicated by arrow 280. As a result of the positioning of the four-way valve 52, the first heat exchange fluid that has entered the third port 164 is directed toward the fourth port 168 such that the fourth port 168 acts as a first outlet, as indicated by arrow 284. From the fourth port 168 of the four-way valve 52, the first heat exchange fluid is directed toward the inlet 76 of the first heat exchanger 28. Within the first heat exchanger 28, the first heat exchange fluid may absorb heat from fluid with which the first heat exchanger 28 is additionally in contact (e.g., ambient air that is exterior to a vehicle).

Referring again to FIG. 5, upon exiting the first heat exchanger 28 by way of the outlet 188, the first heat exchange fluid is directed toward the first port 192 of the second three-way valve 84. As a result of the positioning of the second three-way valve 84 in the heating mode of operation, the first heat exchange fluid that has been received at the first port 192 is directed toward the second port 196 of the second three-way valve 84 such that the second port 196 operates as an outlet. From the second port 196, the first heat exchange fluid is directed toward the second shutoff valve 100. More specifically, the second shutoff valve 100 may be positioned along a bridging portion 288 of the refrigerant network of conduits 68. For example, a first end of the bridging portion 288 can be referred to as a first bridging point 292 and a second end of the bridging portion 288 can be referred to as a second bridging point 296. The first bridging point 292 can be positioned between the second port 196 of the second three-way valve 84 and the first shutoff valve 96. The second bridging point 296 can be positioned between the second port 176 of the first three-way valve 72 and the first port 156 of the four-way valve 52. In the heating mode of operation, the first shutoff valve 96 is placed in the closed position and the second shutoff valve 100 is placed in the open position. Accordingly, the first heat exchange fluid that exits the second port 196 of the second three-way valve 84 passes through the second shutoff valve 100 and is directed toward the first port 156 of the four-way valve 52, Therefore, the first port 156 of the four-way valve 52 operates as a second inlet during the heating mode of operation, as indicated by arrow 300. The first heat exchange fluid that is received at the first port 156 is directed out of the second port 160 of the four-way valve 52 such that the second port 160 operates as a second outlet, as indicate by arrow 304. From the second port 160 of the four-way valve 52, the first heat exchange fluid is directed toward a third port 308 of the third three-way valve 88. The positioning of the third three-way valve 88 in the heating mode of operation directs the first heat exchange fluid received at the third port 308 to exit the third three-way valve 88 at the second port 236 of the third three-way valve 88. From the second port 236 of the third three-way valve 88, the first heat exchange fluid is directed toward the accumulator 92, where the accumulator 92 performs as outlined previously. The gaseous component of the first heat exchange fluid is then introduced to the low-pressure inlet 56 of the compressor 44 from the accumulator 92.

Referring now to FIGS. 6 and 7, from the third shutoff valve 104, the first heat exchange fluid is directed toward the third expansion valve 124. The second three-way valve 84 is positioned in such a way to prevent the first heat exchange fluid from passing through the second three-way valve 84 on its way to the third expansion valve 124. The first heat exchange fluid experiences a decrease in pressure and temperature as a result of interaction with the third expansion valve 124. After exiting the third expansion valve 124, the first heat exchange fluid is directed toward the inlet 224 of the third heat exchanger 36. The decreased temperature and pressure of the first heat exchange fluid flowing through the third heat exchanger 36 can be employed to provide cooling to air that is flowing through the ductwork 154 with which the third heat exchanger 36 is in fluid communication. Accordingly, the first heat exchange fluid that exits the third heat exchanger 36 by way of the outlet 228 of the third heat exchanger 36 may have an increased pressure, temperature, and/or vapor percentage than the first heat exchange fluid that entered the third heat exchanger 36 at the inlet 224. The cooling of the air within the ductwork 154 that is provided by the third heat exchanger 36 in these modes of operation can be employed as a way of controlling a humidity level within the air circulated through the ductwork 154 (e.g., dehumidification). For example, the cooling of the air within the ductwork 154 that is provided by the third heat exchanger 36 can result in condensing of at least some gaseous components of the air (e.g., water vapor) passing through the ductwork 154. Upon exiting the third heat exchanger 36 by way of the outlet 228, the first heat exchange fluid is directed toward the first port 232 of the third three-way valve 88. As a result of the position of the third three-way valve 88, the first heat exchange fluid that is received at the first port 232 is directed out of the second port 236 of the third three-way valve and toward the accumulator 92. The accumulator 92 receives the first heat exchange fluid and provides a gaseous component of the first heat exchange fluid to the low-pressure inlet 56 of the compressor 44. The mode of operation depicted in FIG. 6 may be referred to as a first reheat mode of operation. The mode of operation depicted in FIG. 7 may be referred to as a second reheat mode of operation.

With specific reference to FIG. 7, in addition to the third heat exchanger 36 receiving the first heat exchange fluid that exits the third shutoff valve 104, the fourth heat exchanger 40 receives the first heat exchange fluid that has exited the third shutoff valve 104. More specifically, in the second reheat mode of operation, the fourth expansion valve 128 receives a portion of the first heat exchange fluid that encounters the second branching point 240. As described above, at the second branching point 240, the first portion of the first heat exchange fluid is directed toward the fourth expansion valve 128 and the second portion of the first heat exchange fluid is directed toward the third expansion valve 124. As the interaction with the third expansion valve 124 and the third heat exchanger 36 has already been discussed with regard to the second reheat mode of operation, the interaction between the first portion of the first heat exchange fluid, the fourth expansion valve 128, the fourth heat exchanger 40, and the check valve 252 will now be focused on. The first portion of the first heat exchange fluid experiences a decrease in pressure and temperature as a result of interaction with the fourth expansion valve 128.

Referring again to FIG. 7, after exiting the fourth expansion valve 128, the first heat exchange fluid is directed toward the inlet 244 of the fourth heat exchanger 40. The decreased temperature and pressure of the first heat exchange fluid flowing through the fourth heat exchanger 40 as a result of interaction with the fourth expansion valve 128 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 248 of the fourth heat exchanger 40 may have an increased pressure, temperature, and/or vapor percentage than the first heat exchange fluid that entered the fourth heat exchanger 40 at the inlet 244. Upon exiting the fourth heat exchanger 40 by way of the outlet 248, the first heat exchange fluid is directed toward the check valve 252 by the refrigerant network of conduits 68. Once the first heat exchange fluid passes through the check valve 252, the first portion of the first heat exchange fluid that was directed toward the fourth heat exchanger 40 is rejoined or recombined with the second portion of the first heat exchange fluid that was directed toward the third heat exchanger 36. The first and second portions of the first heat exchange fluid are rejoined or recombined downstream of the outlet 228 of the third heat exchanger 36. The check valve 252 prevents backflow or excessive back pressure at the outlet 248 of the fourth heat exchanger 40. From the check valve 252, the first heat exchange fluid is directed toward the first port 232 of the third three-way valve 88. As a result of the position of the third three-way valve 88, the first heat exchange fluid that is received at the first port 232 is directed out of the second port 236 of the third three-way valve and toward the accumulator 92. The accumulator 92 receives the first heat exchange fluid and provides a gaseous components of the first heat exchange fluid to the low-pressure inlet 56 of the compressor 44.

Figure 8:
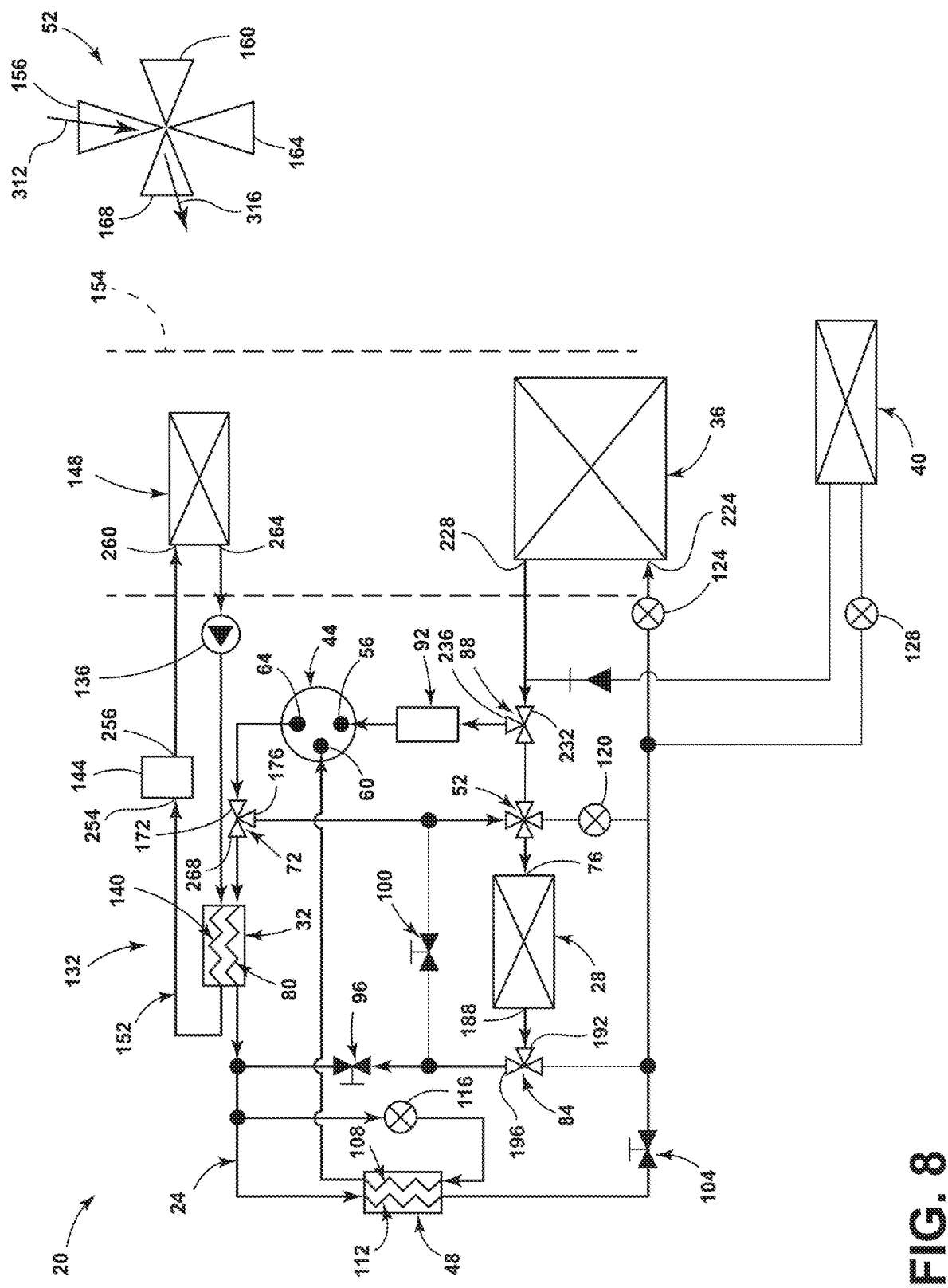
FIG. 8 is a schematic representation of the heat pump arrangement, illustrating a third reheat mode of operation, according to one example.
Figure 9:
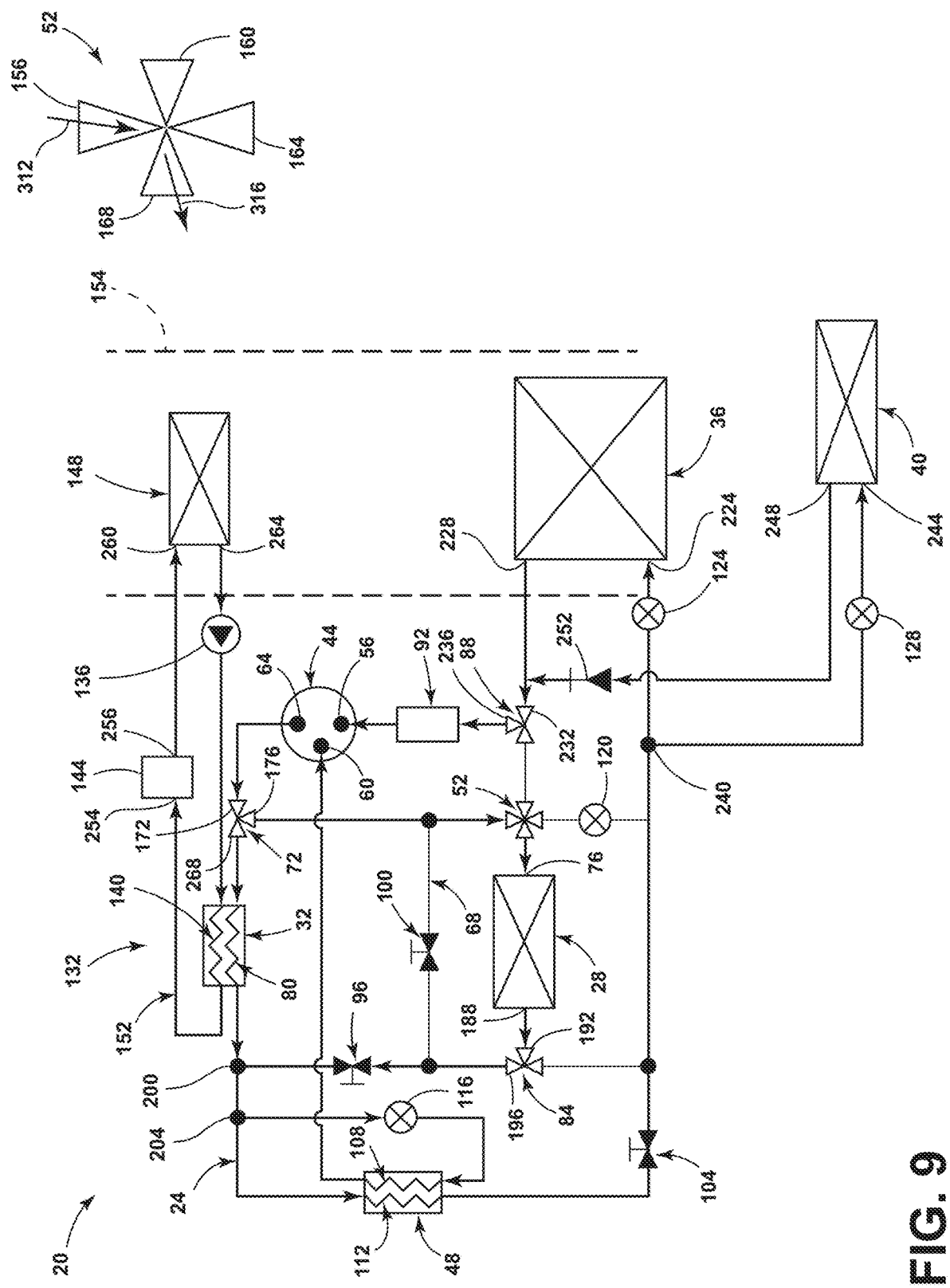
FIG. 9 is a schematic representation of the heat pump arrangement, illustrating a fourth reheat mode of operation, according to one example.

Referring now to FIGS. 8 and 9, a third reheat mode of operation (FIG. 8) and a fourth reheat mode of operation (FIG. 9) are depicted in exemplary form. The third reheat mode of operation may additionally, or alternatively, be referred to as a first defrost mode of operation. Similarly, the fourth reheat mode of operation may additionally, or alternatively, be referred to as a second defrost mode of operation. In these modes of operation, the first three-way valve 72 is positioned such that the first heat exchange fluid received from the outlet 64 of the compressor 44 by the first port 172 of the first three-way valve 72 is directed to exit the second port 176 and the third port 268. In various examples, the first three-way valve 72 may be a three-way proportional valve that includes one inlet and two outlets. Alternatively, in some examples, the first three-way valve 72 may be substituted for two two-way valves to accomplish the fluidic control articulated herein. The portion of the first heat exchange fluid that exits the first three-way valve 72 by way of the second port 176 flows to the first port 156 of the four-way valve 52. The four-way valve 52 is adjusted in its position to receive the first heat exchange fluid at the first port 156 such that the first port 156 operates as an inlet, as indicated by arrow 312. The position of the four-way valve 52 directs the first heat exchange fluid received at the first port 156 to exit the four-way valve 52 at the fourth port 168, as indicated by arrow 316. Upon exiting the fourth port 168 of the four-way valve 52, the first heat exchange fluid enters the first heat exchanger 28 at the inlet 76 of the first heat exchanger 28. As the first heat exchange fluid flows through the first heat exchanger 28, the first heat exchange fluid may thermally interact with a heat exchange fluid that is external to the refrigerant loop 24 and the coolant loop 132 (e.g., ambient air) such that heat may be removed from the first heat exchange fluid.

Referring again to FIGS. 8 and 9, the first heat exchange fluid exits the first heat exchanger 28 at the outlet 188 of the first heat exchanger 28. Upon exiting the first heat exchanger 28 by way of the outlet 188, the first heat exchange fluid enters into the first port 192 of the second three-way valve 84. The second three-way valve 84 is positioned such that the first heat exchange fluid is directed to the second port 196 of the second three-way valve 84. In each of these modes of operation, the second shutoff valve 100 is in the closed position and the first shutoff valve 96 is in the open position. Upon exiting the second port 196 of the second three-way valve 84, the first heat exchange fluid is directed toward the first shutoff valve 96 by the refrigerant network of conduits 68. After flowing through the first shutoff valve 96, the first heat exchange fluid encounters the first coupling point 200. At the first coupling point 200, first heat exchange fluid that exited the first three-way valve 72 by way of the third port 268 is rejoined with the first heat exchange fluid that exited the first three-way valve 72 by way of the second port 176. Prior to reaching the first coupling point 200, the first heat exchange fluid that exited the first three-way valve 72 by way of the third port 268 passes through the first region 80 of the second heat exchanger 32. Within the second heat exchanger 32, the first heat exchange fluid thermally interacts with the second heat exchange fluid in the manner already described. From the first coupling point 200, the recombined first heat exchange fluid is directed toward the first branching point 204. As the first heat exchange fluid encounters the first branching point 204, a portion of the first heat exchange fluid is diverted toward the first expansion valve 116, while the remaining portion of the first heat exchange fluid continues toward the second region 112 of the vapor generator 48 in the manner already described. From the vapor generator 48, the first heat exchange fluid is directed toward the third shutoff valve 104.

Referring further to FIGS. 8 and 9, from the third shutoff valve 104, the first heat exchange fluid is directed toward the third expansion valve 124. The first heat exchange fluid experiences a decrease in pressure and temperature as a result of interaction with the third expansion valve 124. After exiting the third expansion valve 124, the first heat exchange fluid is directed toward the inlet 224 of the third heat exchanger 36. The decreased temperature and pressure of the first heat exchange fluid flowing through the third heat exchanger 36 can be employed to provide cooling to air that is flowing through the ductwork 154 with which the third heat exchanger 36 is in fluid communication. Accordingly, the first heat exchange fluid that exits the third heat exchanger 36 by way of the outlet 228 of the third heat exchanger 36 may have an increased pressure, temperature, and/or vapor percentage than the first heat exchange fluid that entered the third heat exchanger 36 at the inlet 224. The cooling of the air within the ductwork 154 that is provided by the third heat exchanger 36 in these modes of operation can be employed as a way of controlling a humidity level within the air circulated through the ductwork 154 (e.g., dehumidification). Upon exiting the third heat exchanger 36 by way of the outlet 228, the first heat exchange fluid is directed toward the first port 232 of the third three-way valve 88. As a result of the position of the third three-way valve 88, the first heat exchange fluid that is received at the first port 232 is directed out of the second port 236 of the third three-way valve and toward the accumulator 92. The accumulator 92 receives the first heat exchange fluid and provides a gaseous components of the first heat exchange fluid to the low-pressure inlet 56 of the compressor 44.

With specific reference to FIG. 9, in addition to the third heat exchanger 36 receiving the first heat exchange fluid that exits the third shutoff valve 104, the fourth heat exchanger 40 receives the first heat exchange fluid that has exited the third shutoff valve 104. More specifically, in the fourth reheat mode of operation, the fourth expansion valve 128 receives a portion of the first heat exchange fluid that encounters the second branching point 240. As described above, at the second branching point 240, the first portion of the first heat exchange fluid is directed toward the fourth expansion valve 128 and the second portion of the first heat exchange fluid is directed toward the third expansion valve 124. As the interaction with the third expansion valve 124 and the third heat exchanger 36 has already been discussed with regard to the fourth reheat mode of operation, the interaction between the first portion of the first heat exchange fluid, the fourth expansion valve 128, the fourth heat exchanger 40, and the check valve 252 will now be focused on. The first portion of the first heat exchange fluid experiences a decrease in pressure and temperature as a result of interaction with the fourth expansion valve 128.

Referring again to FIG. 9, after exiting the fourth expansion valve 128, the first heat exchange fluid is directed toward the inlet 244 of the fourth heat exchanger 40. The decreased temperature and pressure of the first heat exchange fluid flowing through the fourth heat exchanger 40 as a result of interaction with the fourth expansion valve 128 can be employed to decrease the temperature of heat-producing components with which the fourth heat exchanger 40 interacts (e.g., electric motors, batteries, electronics, etc.).

Accordingly, the first heat exchange fluid that exits the fourth heat exchanger 40 by way of the outlet 248 of the fourth heat exchanger 40 may have an increased pressure, temperature, and/or vapor percentage than the first heat exchange fluid that entered the fourth heat exchanger 40 at the inlet 244. Upon exiting the fourth heat exchanger 40 by way of the outlet 248, the first heat exchange fluid is directed toward the check valve 252 by the refrigerant network of conduits 68. Once the first heat exchange fluid passes through the check valve 252, the first portion of the first heat exchange fluid that was directed toward the fourth heat exchanger 40 is rejoined or recombined with the second portion of the first heat exchange fluid that was directed toward the third heat exchanger 36. The first and second portions of the first heat exchange fluid are rejoined or recombined downstream of the outlet 228 of the third heat exchanger 36. The check valve 252 prevents backflow or excessive back pressure at the outlet 248 of the fourth heat exchanger 40. From the check valve 252, the first heat exchange fluid is directed toward the first port 232 of the third three-way valve 88. As a result of the position of the third three-way valve 88, the first heat exchange fluid that is received at the first port 232 is directed out of the second port 236 of the third three-way valve and toward the accumulator 92. The accumulator 92 receives the first heat exchange fluid and provides a gaseous components of the first heat exchange fluid to the low-pressure inlet 56 of the compressor 44.

Figure 10:
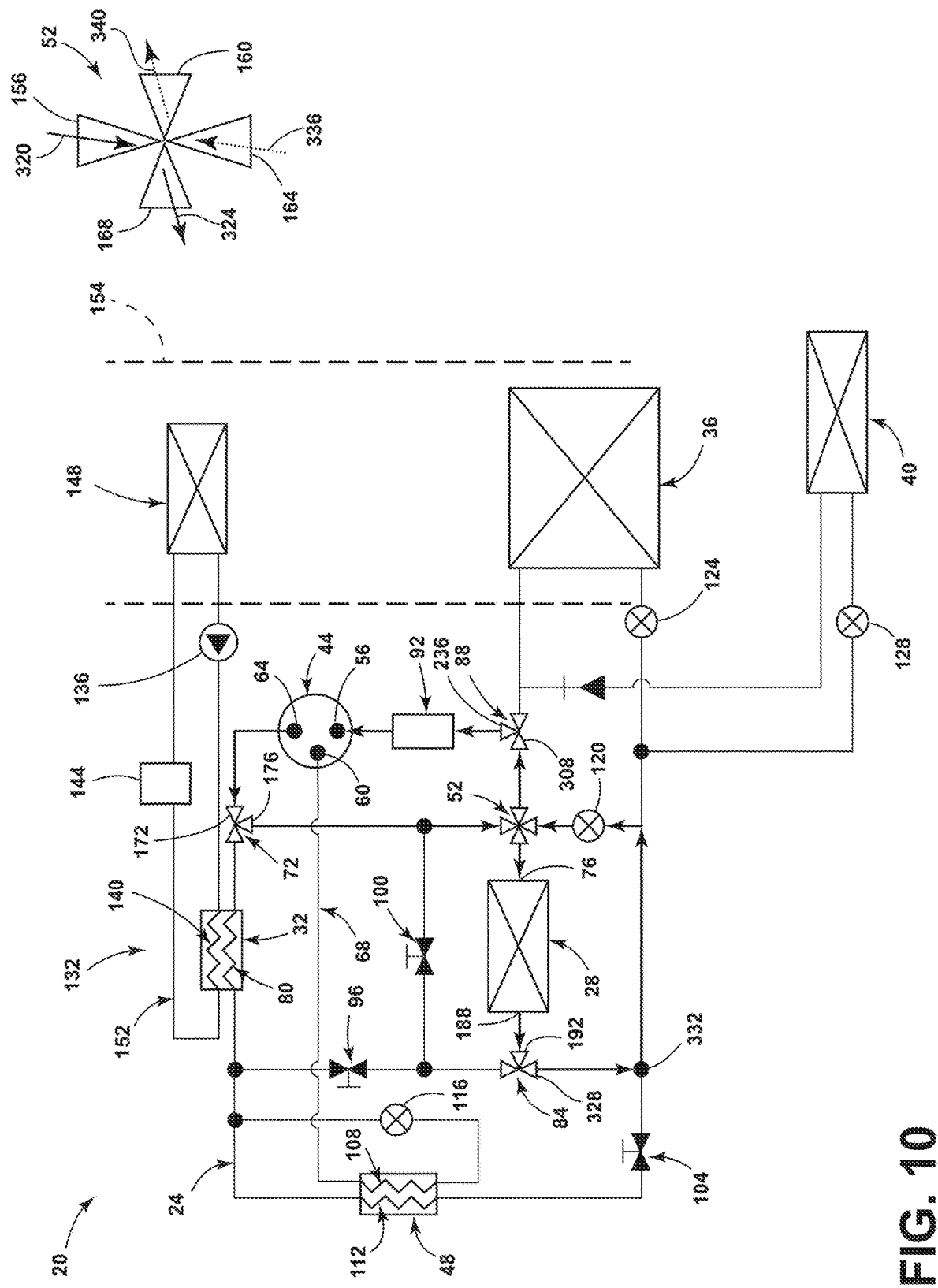
FIG. 10 is a schematic representation of the heat pump arrangement, illustrating a first deicing mode of operation, according to one example.
Figure 11:
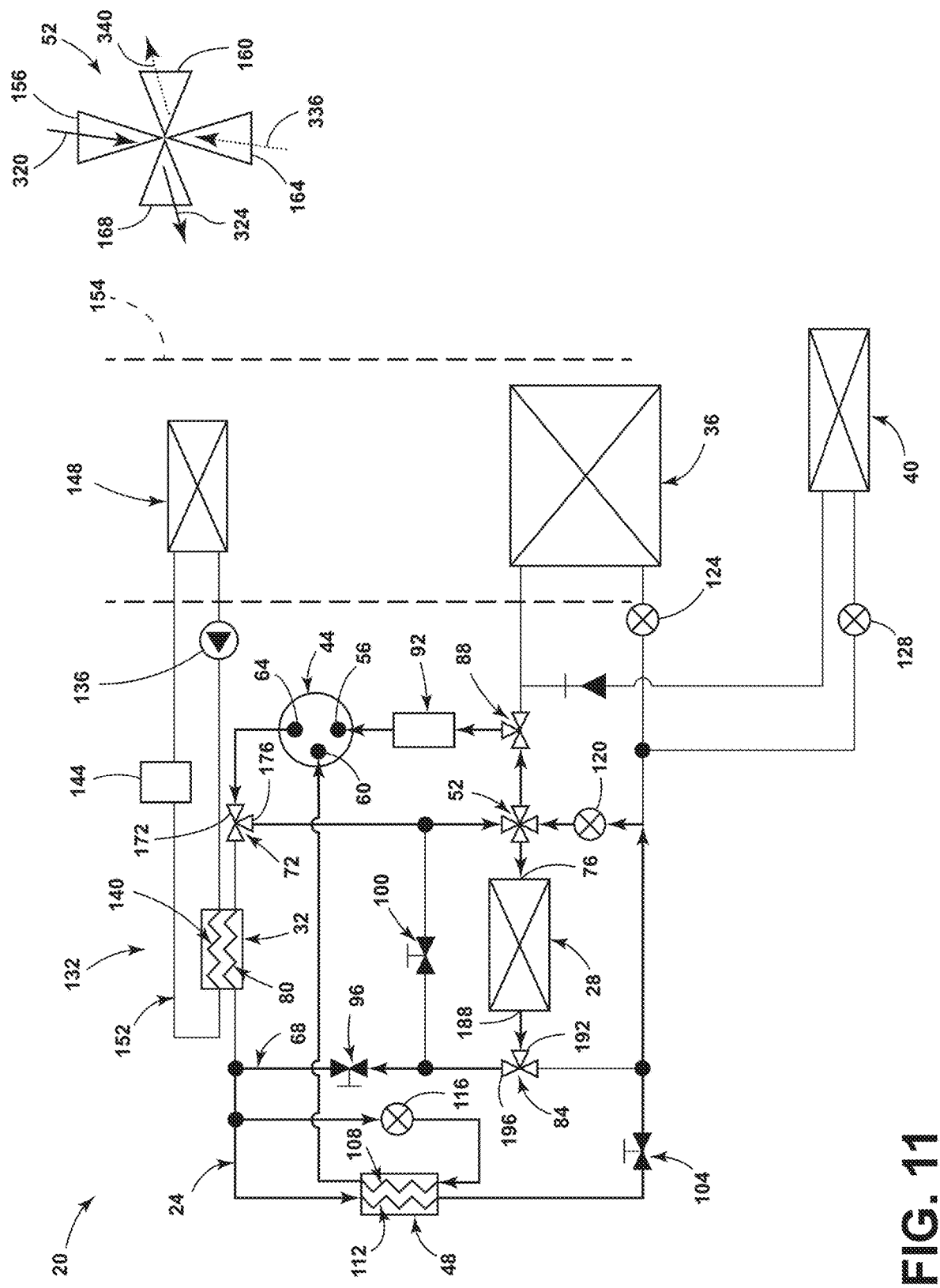
FIG. 11 is a schematic representation of the heat pump arrangement, illustrating a second deicing mode of operation, according to one example.
Figure 12:
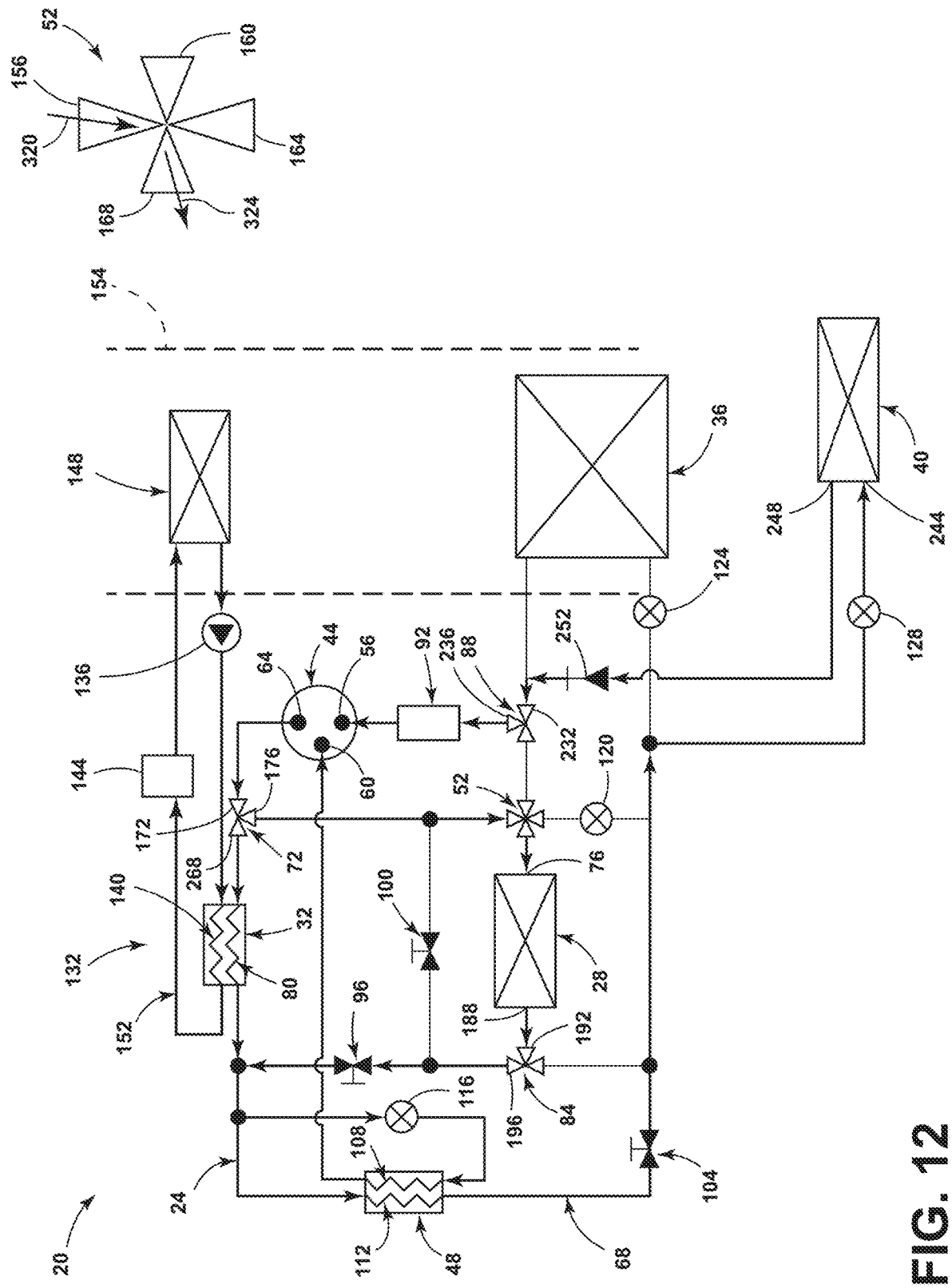
FIG. 12 is a schematic representation of the heat pump arrangement, illustrating a heating and deicing mode of operation, according to one example.

Referring now to FIGS. 10-12, a first deicing mode of operation (FIG. 10), a second deicing mode of operation (FIG. 11), and a heat and deicing mode of operation (FIG. 12) are depicted in exemplary form. In each of these modes of operation, the compressor 44 drives the first heat exchange fluid from the outlet 64 to the first port 172 of the first three-way valve 72. The positioning of the first three-way valve 72 directs the first heat exchange fluid that is received at the first port 172 to exit the first three-way valve 72 at the second port 176. In the heat and deicing mode of operation depicted in FIG. 12, the positioning of the first three-way valve 72 additionally directs the first heat exchange fluid that is received at the first port 172 to exit the first three-way valve 72 at the third port 268. Accordingly, in the heat and deicing mode of operation depicted in FIG. 12, the first heat exchange fluid flows into the first port 172 and out of both the second port 176 and the third port 268. The first heat exchange fluid that exits the second port 176 of the first three-way valve 72 is directed toward the first port 156 of the four-way valve 52. Accordingly, the first port 156 operates as a first inlet, as indicated by arrow 320. The position of the four-way valve 52 directs the first heat exchange fluid received at the first port 156 to exit the four-way valve 52 at the fourth port 168 such that the fourth port 168 operates as a first outlet, as indicated by arrow 324. Upon exiting the fourth port 168 of the four-way valve 52, the first heat exchange fluid enters the first heat exchanger 28 at the inlet 76 of the first heat exchanger 28. As the first heat exchange fluid flows through the first heat exchanger 28, the first heat exchange fluid may thermally interact with a heat exchange fluid that is external to the refrigerant loop 24 and the coolant loop 132 (e.g., ambient air) such that heat may be removed from the first heat exchange fluid.

With specific reference to FIG. 10, the first heat exchange fluid exits the first heat exchanger 28 at the outlet 188 of the first heat exchanger 28. Upon exiting the first heat exchanger 28 by way of the outlet 188, the first heat exchange fluid enters into the first port 192 of the second three-way valve 84. The second three-way valve 84 is positioned such that the first heat exchange fluid that is received at the first port 192 is directed to exit the second three-way valve by way of a third port 328 thereof. From the third port 328 of the second three-way valve 84, the first heat exchange fluid is directed toward a coupling point 332. From the second coupling point 332, the first heat exchange fluid progresses to the second expansion valve 120. The first heat exchange fluid experiences a decreases in pressure and temperature as a result of interaction with the second expansion valve 120. From the second expansion valve 120, the first heat exchange fluid is direct toward the third port 164 of the four-way valve 52. Accordingly, the positioning of the four-way valve 52 in the first deicing mode of operation employs the third port 164 of the four-way valve 52 as a second inlet, as indicated by arrow 336. As a result of the positioning of the four-way valve 52, the first heat exchange fluid that has entered the third port 164 is directed toward the second port 160 such that the second port 160 acts as a second outlet, as indicated by arrow 340. From the fourth port 168 of the four-way valve 52, the first heat exchange fluid is directed toward the third port 308 of the third three-way valve 88. The first heat exchange fluid received at the third port 208 is directed to exit the third three-way valve 88 at the second port 236 as a result of the positioning of the third three-way valve 88. The accumulator 92 receives the first heat exchange fluid that exits the second port 236 of the third three-way valve 88 and provides a gaseous component of the first heat exchange fluid to the low-pressure inlet 56 of the compressor 44.

Referring to FIGS. 11 and 12, the first heat exchange fluid exits the first heat exchanger 28 at the outlet 188 of the first heat exchanger 28. Upon exiting the first heat exchanger 28 by way of the outlet 188, the first heat exchange fluid enters into the first port 192 of the second three-way valve 84. The second three-way valve 84 is positioned such that the first heat exchange fluid received at the first port 192 is directed to the second port 196 of the second three-way valve 84. In each of these modes of operation, the second shutoff valve 100 is in the closed position and the first shutoff valve 96 is in the open position. Upon exiting the second port 196 of the second three-way valve 84, the first heat exchange fluid is directed toward the first shutoff valve 96 by the refrigerant network of conduits 68. After flowing through the first shutoff valve 96, the first heat exchange fluid encounters the first coupling point 200. With regard to FIG. 12, at the first coupling point 200, the first heat exchange fluid that exited the first three-way valve 72 by way of the third port 268 is rejoined with the first heat exchange fluid that exited the first three-way valve 72 by way of the second port 176. Again with regard to FIG. 12, prior to reaching the first coupling point 200, the first heat exchange fluid that exited the first three-way valve 72 by way of the third port 268 passes through the first region 80 of the second heat exchanger 32. With further reference to FIG. 12, within the second heat exchanger 32, the first heat exchange fluid thermally interacts with the second heat exchange fluid in the manner already described. From the first coupling point 200, the first heat exchange fluid is directed toward the first branching point 204. As the first heat exchange fluid encounters the first branching point 204, a portion of the first heat exchange fluid is diverted toward the first expansion valve 116, while the remaining portion of the first heat exchange fluid continues toward the second region 112 of the vapor generator 48 in the manner already described. From the vapor generator 48, the first heat exchange fluid is directed toward the third shutoff valve 104.

With specific reference to FIG. 11, from the third shutoff valve 104, the first heat exchange fluid progresses to the second expansion valve 120. The first heat exchange fluid experiences a decreases in pressure and temperature as a result of interaction with the second expansion valve 120. From the second expansion valve 120, the first heat exchange fluid is direct toward the third port 164 of the four-way valve 52. Accordingly, the positioning of the four-way valve 52 in the second deicing mode of operation employs the third port 164 of the four-way valve 52 as a second inlet, as indicated by arrow 336. As a result of the positioning of the four-way valve 52, the first heat exchange fluid that has entered the third port 164 is directed toward the second port 160 such that the second port 160 acts as a second outlet, as indicated by arrow 340. From the fourth port 168 of the four-way valve 52, the first heat exchange fluid is directed toward the third port 308 of the third three-way valve 88. The first heat exchange fluid received at the third port 208 is directed to exit the third three-way valve 88 at the second port 236 as a result of the positioning of the third three-way valve 88. The accumulator 92 receives the first heat exchange fluid that exits the second port 236 of the third three-way valve 88 and provides a gaseous component of the first heat exchange fluid to the low-pressure inlet 56 of the compressor 44.

With specific reference to FIG. 12, from the third shutoff valve 104, the first heat exchange fluid is directed toward the fourth expansion valve 128. The first heat exchange fluid experiences a decrease in pressure and temperature as a result of interaction with the fourth expansion valve 128. After exiting the fourth expansion valve 128, the first heat exchange fluid is directed toward the inlet 244 of the fourth heat exchanger 40. The decreased temperature and pressure of the first heat exchange fluid flowing through the fourth heat exchanger 40 as a result of interaction with the fourth expansion valve 128 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 248 of the fourth heat exchanger 40 may have an increased pressure, temperature, and/or vapor percentage than the first heat exchange fluid that entered the fourth heat exchanger 40 at the inlet 244. Upon exiting the fourth heat exchanger 40 by way of the outlet 248, the first heat exchange fluid is directed toward the check valve 252 by the refrigerant network of conduits 68. From the check valve 252, the first heat exchange fluid is directed toward the first port 232 of the third three-way valve 88. As a result of the position of the third three-way valve 88, the first heat exchange fluid that is received at the first port 232 is directed out of the second port 236 of the third three-way valve and toward the accumulator 92. The accumulator 92 receives the first heat exchange fluid and provides a gaseous components of the first heat exchange fluid to the low-pressure inlet 56 of the compressor 44.

As mentioned above, at least one component chosen from the first heat exchanger 28, the second heat exchanger 32, and the vapor generator 48 is free from flow driven by the compressor 44 (i.e., compressor-driven flow) of the first heat exchange fluid during a first predetermined set of heating modes of the heat pump 20 and a first predetermined set of cooling modes of the heat pump 20. The first predetermined set of cooling modes of operation of the heat pump 20 can include the cooling mode of operation (FIG. 2), the cabin and battery cooling mode of operation (FIG. 3), and/or the battery cooling mode of operation (FIG. 4). The first predetermined set of heating modes of operation can include the first reheat mode of operation (FIG. 6), the second reheat mode of operation (FIG. 7), the first deicing mode of operation (FIG. 10), and/or the second deicing mode of operation (FIG. 11).

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A heat pump, comprising:
   a refrigerant loop comprising:
      a first heat exchanger;
      a first region of a second heat exchanger;
      a third heat exchanger;
      a fourth heat exchanger;
      a first heat exchange fluid;
      a compressor having a low-pressure inlet, a mid-pressure inlet, and an outlet;
      a vapor generator positioned downstream of the outlet of the compressor and upstream of both the low-pressure inlet and the mid-pressure inlet;
      a four-way valve positioned immediately upstream of the first heat exchanger;
      a plurality of additional valves, at least one of which is selectively operable as a shutoff valve to prevent compressor-driven flow through a portion of the refrigerant loop, wherein at least one component chosen from the group consisting of the third heat exchanger, the fourth heat exchanger, and the vapor generator is free from compressor-driven flow of the first heat exchange fluid during a predetermined set of heating modes of operation of the heat pump and a predetermined set of cooling modes of operation of the heat pump.

2. The heat pump of claim 1, wherein the refrigerant loop further comprises:
   a first three-way valve positioned downstream of the outlet of the compressor and upstream of an inlet of the first heat exchanger, wherein the first three-way valve is positioned upstream of the first region of the second heat exchanger.

3. The heat pump of claim 2, wherein the four-way valve is positioned downstream of the first three-way valve.

4. The heat pump of claim 3, wherein the refrigerant loop further comprises:
   a second three-way valve positioned immediately downstream of the first heat exchanger.

5. The heat pump of claim 4, wherein the refrigerant loop further comprises:
   a third three-way valve positioned downstream of the third heat exchanger, wherein the third three-way valve is positioned downstream of the fourth heat exchanger, and wherein the third three-way valve is positioned upstream of the low-pressure inlet.

6. The heat pump of claim 5, wherein the refrigerant loop further comprises:
   an accumulator positioned immediately upstream of the low-pressure inlet of the compressor and immediately downstream of the third three-way valve.

7. The heat pump of claim 1, wherein the refrigerant loop further comprises:
   a first shutoff valve plumbed in series with the first heat exchanger; and
   a second shutoff valve plumbed in parallel with the first heat exchanger, wherein the first shutoff valve is in a closed position when the second shutoff valve is in an open position, and wherein the second shutoff valve is in a closed position when the first shutoff valve is in an open position.

8. The heat pump of claim 7, wherein the refrigerant loop further comprises:
   a third shutoff valve positioned downstream of the vapor generator.

9. The heat pump of claim 1, wherein the vapor generator is a liquid-gas separator valve.

10. The heat pump of claim 1, wherein the vapor generator is a plate-style heat exchanger.

11. The heat pump of claim 10, wherein plurality of additional valves comprises:
    a first expansion valve positioned upstream of a first region of the vapor generator.

12. The heat pump of claim 11, wherein plurality of additional valves comprises:
    a second expansion valve positioned upstream of the four-way valve;
    a third expansion valve positioned immediately upstream of the third heat exchanger; and
    a fourth expansion valve positioned immediately upstream of the fourth heat exchanger.

13. The heat pump of claim 1, further comprising:
    a coolant loop comprising:
       a second region of the second heat exchanger;
       a pump;
       a fifth heat exchanger; and
       a reservoir.

* * * * *